US010867218B2

(12) United States Patent
Gallagher et al.

(10) Patent No.: US 10,867,218 B2
(45) Date of Patent: Dec. 15, 2020

(54) BIOMETRIC SENSOR FUSION TO CLASSIFY VEHICLE PASSENGER STATE

(71) Applicant: LEAR CORPORATION, Southfield, MI (US)

(72) Inventors: David Gallagher, Sterling Heights, MI (US); Francesco Migneco, Salene, MI (US); Arjun Yetukuri, Rochester Hills, MI (US); Jasmine Pizana, Scottville, MI (US); Steven T. Stavropoulos, Novi, MI (US); Pat Carlsen, Grosse Pointe, MI (US); Abhay Prakash, Mumbai (IN)

(73) Assignee: Lear Corporation, Southfield, MI (US)

( * ) Notice: Subject to any disclaimer, the term of this patent is extended or adjusted under 35 U.S.C. 154(b) by 218 days.

(21) Appl. No.: 15/963,697

(22) Filed: Apr. 26, 2018

(65) Prior Publication Data
US 2019/0332902 A1   Oct. 31, 2019

(51) Int. Cl.
*G06K 9/62*   (2006.01)
*G06K 9/00*   (2006.01)
*B60R 25/25*  (2013.01)

(52) U.S. Cl.
CPC ............ *G06K 9/6293* (2013.01); *B60R 25/25* (2013.01); *G06K 9/00335* (2013.01)

(58) Field of Classification Search
USPC ........................................................ 701/36
See application file for complete search history.

(56) References Cited

U.S. PATENT DOCUMENTS 5,694,939 A * 12/1997 Cowings ................ A61B 5/486
                                                 600/484
5,807,114 A *  9/1998 Hodges ................. A61M 21/00
                                                 434/219
(Continued)

FOREIGN PATENT DOCUMENTS

CN       204147427 U      2/2015
DE        10126224 A1    12/2002
(Continued)

OTHER PUBLICATIONS

Stout, Cynthia S., et al., Increasing Accuracy in the Assessment of Motion Sickness: A Construct Methodology, Ames Research Center, NASA Technical Memorandum 108797, Dec. 1993, Moffett Field, California.

(Continued)

*Primary Examiner* — Jean Paul Cass
(74) *Attorney, Agent, or Firm* — Brooks Kushman P.C.

(57) ABSTRACT

A neural network is used in a vehicle component to determine the stress level or arousal level of a vehicle occupant. Sensors in the vehicle cabin, e.g., the seat, sense biological characteristics of the occupant, e.g., neuro-electrical signals, cardiac characteristics, body temperature and the like. The neural network can compute and classify the emotional state of the occupant in real-time. The vehicle can trigger warnings, indicators and stress counter-measures when the occupant exceeds a threshold. The counter-measures can include visual and audio feedback within the vehicle cabin. The neural network can provide historical occupant emotional states that can be used by the navigation system to avoid travel segments that may trigger undesired emotional states in the occupant.

16 Claims, 11 Drawing Sheets

(56) References Cited

U.S. PATENT DOCUMENTS

| | | | |
|---|---|---|---|
| 6,366,207 B1 | 4/2002 | Murphy | |
| 6,438,399 B1* | 8/2002 | Kurth | A61B 5/14553 |
| | | | 600/323 |
| 7,138,922 B2 | 11/2006 | Strumolo et al. | |
| 7,437,219 B2 | 10/2008 | Bos | |
| 7,774,052 B2 | 8/2010 | Burton et al. | |
| 8,698,639 B2 | 4/2014 | Fung et al. | |
| 8,903,494 B2 | 12/2014 | Goldwasser et al. | |
| 9,002,458 B2 | 4/2015 | Pal et al. | |
| 9,014,811 B2 | 4/2015 | Pal et al. | |
| 9,124,955 B2 | 9/2015 | Geva et al. | |
| 9,135,803 B1 | 9/2015 | Fields et al. | |
| 9,149,236 B2 | 10/2015 | Chun et al. | |
| 9,233,244 B2 | 1/2016 | Pal et al. | |
| 9,272,689 B2 | 3/2016 | Fung et al. | |
| 9,298,985 B2 | 3/2016 | Krueger | |
| 9,302,584 B2 | 4/2016 | Walsh et al. | |
| 9,389,595 B2 | 7/2016 | Caskey et al. | |
| 9,440,646 B2 | 9/2016 | Fung et al. | |
| 9,454,887 B1* | 9/2016 | Matalgah | G08B 21/06 |
| 9,460,601 B2 | 10/2016 | Mimar | |
| 9,463,794 B1 | 10/2016 | Silver et al. | |
| 9,475,502 B2 | 10/2016 | Fung et al. | |
| 9,536,411 B2 | 1/2017 | Foley et al. | |
| 9,539,944 B2 | 1/2017 | Tzirkel-Hancock et al. | |
| 9,712,736 B2* | 7/2017 | Kearns | H04N 5/23206 |
| 9,956,963 B2 | 5/2018 | Vijaya Kumar et al. | |
| 10,054,443 B1* | 8/2018 | Patel | G01C 21/12 |
| 10,210,409 B1 | 2/2019 | Migneco et al. | |
| 10,379,535 B2 | 8/2019 | Migneco et al. | |
| 10,425,459 B2* | 9/2019 | Rider | H04L 67/18 |
| 2006/0015000 A1 | 1/2006 | Kim | |
| 2007/0156295 A1* | 7/2007 | Stephane | G01C 23/00 |
| | | | 701/1 |
| 2009/0174573 A1 | 7/2009 | Smith | |
| 2009/0268022 A1* | 10/2009 | Omi | A61B 5/18 |
| | | | 348/135 |
| 2012/0116198 A1 | 5/2012 | Veen et al. | |
| 2012/0150430 A1* | 6/2012 | French | G01C 21/3453 |
| | | | 701/425 |
| 2012/0259181 A1 | 10/2012 | Fujita et al. | |
| 2012/0265262 A1* | 10/2012 | Osorio | A61N 1/36114 |
| | | | 607/3 |
| 2012/0330173 A1 | 12/2012 | Park et al. | |
| 2013/0204153 A1* | 8/2013 | Buzhardt | A61B 5/0476 |
| | | | 600/544 |
| 2013/0325202 A1 | 12/2013 | Howard et al. | |
| 2014/0136450 A1 | 5/2014 | Lee | |
| 2014/0139655 A1 | 5/2014 | Mimar | |
| 2015/0032382 A1 | 1/2015 | Lee et al. | |
| 2015/0245777 A1* | 9/2015 | Della Torre | A61B 5/11 |
| | | | 600/301 |
| 2015/0313475 A1 | 11/2015 | Benson et al. | |
| 2015/0328985 A1 | 11/2015 | Kim et al. | |
| 2015/0360608 A1 | 12/2015 | Tzirkel-Hancock et al. | |
| 2015/0379362 A1 | 12/2015 | Calmes et al. | |
| 2016/0001781 A1* | 1/2016 | Fung | B60W 40/08 |
| | | | 701/36 |
| 2016/0090097 A1 | 3/2016 | Grube et al. | |
| 2016/0133151 A1 | 5/2016 | O'Dowd et al. | |
| 2016/0260343 A1 | 9/2016 | Resl | |
| 2016/0285938 A1* | 9/2016 | Rider | H04L 65/602 |
| 2016/0292988 A1 | 10/2016 | McCleary et al. | |
| 2016/0354027 A1* | 12/2016 | Benson | B60N 2/002 |
| 2017/0068245 A1 | 3/2017 | Scofield et al. | |
| 2017/0071525 A1 | 3/2017 | Lin et al. | |
| 2017/0083757 A1* | 3/2017 | Enomoto | G06F 3/011 |
| 2017/0136842 A1* | 5/2017 | Anderson | B60G 17/0195 |
| 2017/0188927 A1 | 7/2017 | Nakashima et al. | |
| 2017/0196497 A1 | 7/2017 | Ray et al. | |
| 2017/0267170 A1* | 9/2017 | Be | B60Q 9/00 |
| 2017/0278122 A1* | 9/2017 | Kaehler | G06K 9/00979 |
| 2017/0311831 A1* | 11/2017 | Freer | A61B 5/11 |
| 2017/0351812 A1 | 12/2017 | Green et al. | |
| 2017/0355377 A1* | 12/2017 | Vijaya Kumar | B60W 50/0098 |
| 2017/0360363 A1 | 12/2017 | Fonseca et al. | |
| 2017/0367635 A1 | 12/2017 | Hur et al. | |
| 2017/0367651 A1* | 12/2017 | Tzvieli | A61B 5/0816 |
| 2017/0370732 A1* | 12/2017 | Bender | G01C 21/3492 |
| 2018/0008145 A1 | 1/2018 | Freer et al. | |
| 2018/0136191 A1 | 5/2018 | Asvadi et al. | |
| 2018/0143006 A1 | 5/2018 | White | |
| 2018/0189681 A1 | 7/2018 | Harrivel et al. | |
| 2018/0197636 A1 | 7/2018 | Firminger et al. | |
| 2018/0229674 A1 | 8/2018 | Heinrich et al. | |
| 2018/0276362 A1 | 9/2018 | Baughman et al. | |
| 2019/0049968 A1* | 2/2019 | Dean | G05D 1/0088 |
| 2019/0087691 A1* | 3/2019 | Jelveh | G06K 9/6254 |
| 2019/0108407 A1 | 4/2019 | Okayasu | |
| 2019/0133511 A1 | 5/2019 | Migneco et al. | |
| 2019/0168771 A1 | 6/2019 | Migneco et al. | |
| 2019/0176837 A1* | 6/2019 | Williams | B60W 50/02 |
| 2019/0373038 A1* | 12/2019 | Rider | H04L 65/602 |
| 2019/0373114 A1* | 12/2019 | Gullander | H04M 1/0279 |
| 2020/0012403 A1* | 1/2020 | Sculley | A47C 7/723 |

FOREIGN PATENT DOCUMENTS

| | | |
|---|---|---|
| DE | 102012002037 B4 | 3/2015 |
| EP | 2308559 A2 | 4/2011 |
| FR | 2880166 A1 | 6/2006 |
| JP | 2010241963 A | 10/2010 |
| JP | 2017021651 A | 1/2017 |
| WO | 2007090896 A1 | 8/2007 |

OTHER PUBLICATIONS

Burgess, M., "This car headrest monitors your brain waves to stop you falling asleep at the wheel", WIRED Online Article, Jan. 15, 2017, 9 pgs.

Wess, J., "Prototype Testing of EEG Headrests", Freer Logic Online Article—Comments on Prototype Testing of EEG Headrests, Aug. 3, 2017, 2 pgs.

Lisetti, C., "Affective Intelligent Car Interfaces with Emotion Recognition", In Proceedings of 11th International Conference on Human Computer Interaction, Las Vegas, NV, USA, Jul. 2005.

U.S. Appl. No. 15/830,892, filed Dec. 4, 2017.

U.S. Appl. No. 16/425,865, filed Jul. 29, 2019.

U.S. Appl. No. 15/808,325, filed Nov. 9, 2017.

Migneco, Francesco et al., Preliminary Amendment for U.S. Appl. No. 15/830,892, filed Sep. 23, 2019 (9 Pages).

Migneco, Francesco et al., Amendment Under 37 C.F.R. § 1.111 for U.S. Appl. No. 15/808,325, filed Jan. 9, 2020 (10 Pages).

Migneco, Francesco et al., Amendment Under 37 C.F.R. § 1.111 for U.S. Appl. No. 15/830,892, filed Jun. 17, 2020 (7 Pages).

Amendment Under 37 C.F.R. § 1.111 for U.S. Appl. No. 15/830,892, filed Jun. 17, 2020.

Migneco, Francesco et al., Amendment Under 37 C.F.R. § 1.111 for U.S. Appl. No. 15/808,325, filed Jul. 10, 2020 (10 Pages).

\* cited by examiner

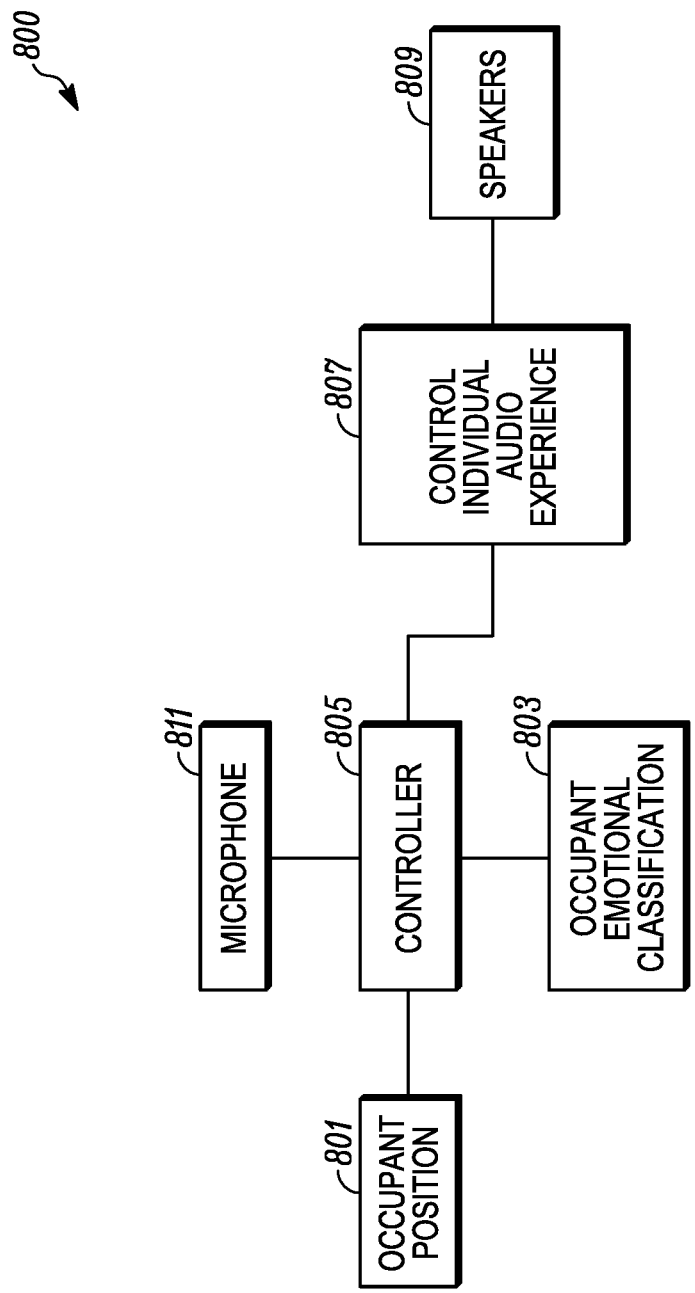

BIOMETRIC SENSOR FUSION TO CLASSIFY VEHICLE PASSENGER STATE

TECHNICAL FIELD

The present disclosure relates to systems with automotive sensor fusion to classify vehicle passenger state.

BACKGROUND

It is advantageous to be able to detect a person's state, e.g., mental state, focus, irritation and attention. For instance, driving a motor vehicle while in a poor state is a significant cause of driver error and possibly preventable road accidents. Vehicle systems that assist in warning a driver of their state take action in such an occurrence may reduce the number of such accidents or attempt to mitigate damage caused by driver distractedness.

SUMMARY

A vehicle system is described that includes a neural network to determine the stress level or emotional state of a vehicle occupant. A first occupant sensor is provided in the vehicle to sense central nervous system characteristics of an occupant. A second occupant sensor is provided in the vehicle to sense non-central nervous system characteristics of the occupant. The neural network receives the sensed central nervous system characteristics and the non-central nervous system characteristics to compute an emotional valence and arousal level of the occupant, e.g., the emotional state.

In an aspect, the first occupant sensor senses neuroelectric signals. The neural network includes a first path to process neuroelectric signals.

In an aspect, the second occupant sensor senses near-infrared spectroscopy signals. The neural network includes a second path to process near-infrared spectroscopy signals.

In an aspect, the first path performs both frequency analysis and temporal analysis of the neuroelectric signals.

In an aspect, the first path includes a plurality of first nodes at a cortical and regional signal analysis layer.

In an aspect, the second path includes a plurality of second nodes at a regional activation/deactivation layer.

A seat is positioned in the vehicle and is configured to support the person as an occupant. The first occupant sensor includes a contactless electro-dermal potential sensor mounted in the seat adjacent a head of the occupant.

In an aspect, the second occupant sensor is a seat-mounted contactless sensor.

In an aspect, the neural network can determine if the emotional valence and arousal level of the occupant exceeds a threshold and outputs an indicator signal when the threshold is exceeded.

In an aspect, a vehicle-to-occupant interface configured to receive the indicator signal from the neural network and to output an indicator notice within a vehicle cabin to the occupant.

In an aspect, the vehicle-to-occupant interface outputs a neural stimulation signal from an emitter in the seat to reduce the occupant state to below the threshold.

In an aspect, the indicator notice includes a stored audio signal to calm the occupant below the threshold.

In an aspect, the indicator notice includes a visual image on a display in the vehicle cabin to calm the occupant below the threshold.

In an aspect, the second occupant sensor includes an interior camera mounted in a vehicle cabin directed at a seat to sense the occupant to determine facial expressions.

In an aspect, the second occupant sensor includes a contactless sensor configured to sense at least one of a sympathetic nervous signal, an autonomic nervous signal, a parasympathetic nervous system signal, or combinations thereof.

A vehicle system can include a first occupant sensor to sense central nervous system characteristics of a vehicle occupant; a second occupant sensor to sense non-central nervous system characteristics of the vehicle occupant; a neural network to receive the sensed central nervous system characteristics and the non-central nervous system characteristics to compute an emotional valence and arousal level of the occupant and output a stress level based on the emotional valence and arousal level; and a navigation system configured to plan a travel route for a vehicle based on a historical stress level of the occupant for segments of the travel route.

In an aspect, the navigation system is configured to receive crime data, accident data and occupant stress data for each segment and when a segment includes a high level of any of crime, accident or stress data, then recalculating the route to include a different segment with a lower level or below a threshold level of any of crime, accident or stress data.

In an aspect, navigation system is configured to receive real-time driving conditions for each segment of the calculated route and indicate when current driving conditions are likely to trigger stress as determined by the neural network Any of the above examples may be combined with each other to form additional embodiments of the present disclosure.

BRIEF DESCRIPTION OF THE DRAWINGS

FIG. 8 is a flow chart of a vehicle process according to an example embodiment.

DETAILED DESCRIPTION

Figure 1:
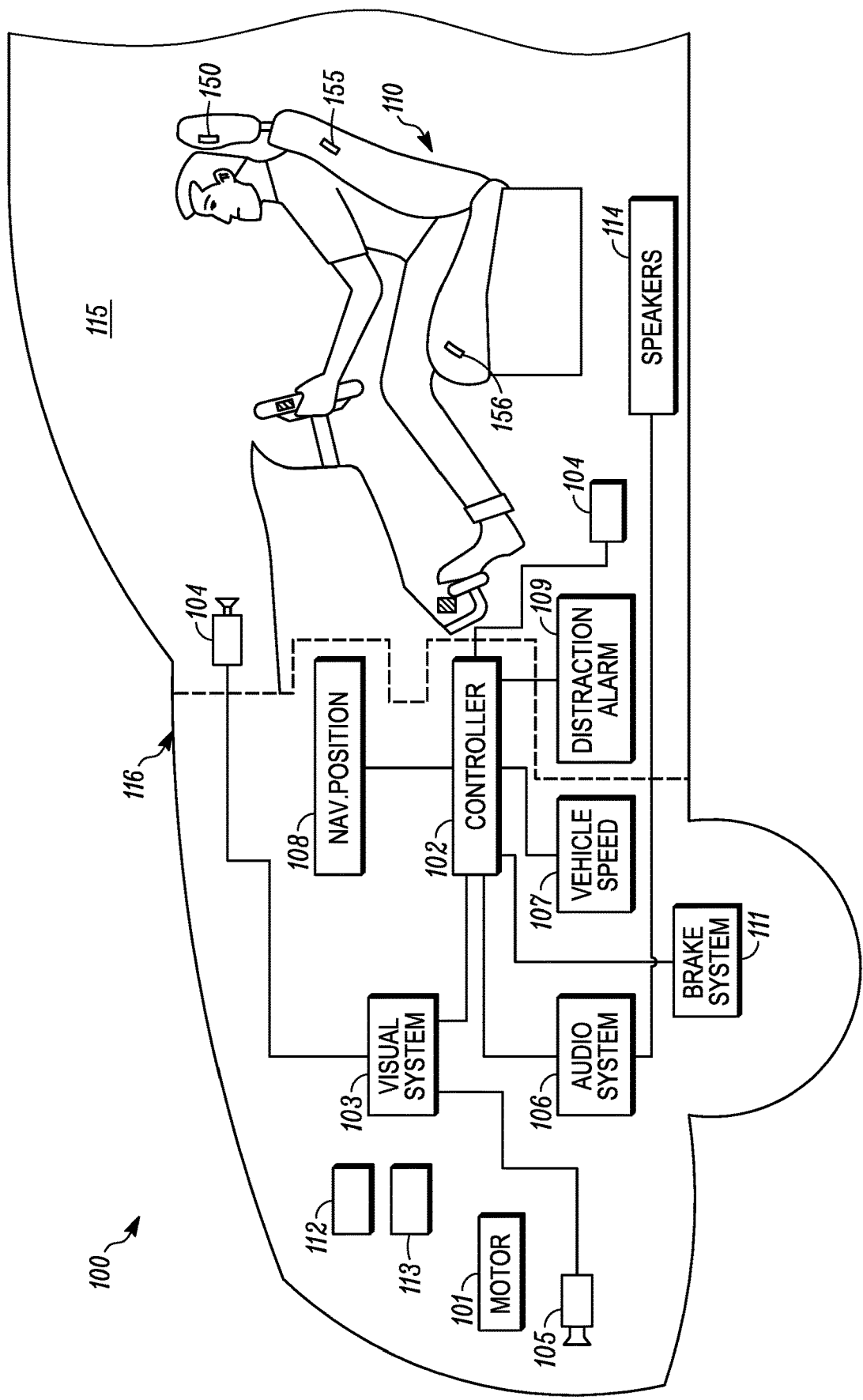
FIG. 1 is a schematic view of a vehicle according to an example embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure is generally directed to vehicle mounted sensors that can be embedded at least partially in the vehicle cabin or in any part of the foam, trim, headrest, frame or a combination thereof of a vehicle seat. The sensors can also be positioned in the headliner, the instrument panel, structural pillars, the steering wheel, or combinations thereof. At least one of the sensors determines the electro-dermal potential originating primarily from brain cortical activity. Such EDP sensing can be contact or non-contact (e.g., field sensing) and can also sense muscle activity and skin characteristics. This will reveal high-level central nervous system (CNS) functions that can be used together to classify the state of a vehicle passenger, e.g., an automotive driver. The system as described herein can use signals relating to the CNS, sympathetic nervous system (SNS), autonomic nervous system (ANS), parasympathetic nervous system (PSNS), and peripheral nervous system (PNS). The sensed items described herein employ real-time processing of the electrical potential fluctuations, e.g., comparing various frequency bands of the sensed signal with respect to each other. These can act as the primary brain activity quantitative classifiers. The present systems may use the sensed signals along with other sensor information to classify the passenger emotional state, e.g., emotional valence and arousal level (which can be represented as a vector). This system, through the acquisition of the appropriate physiological metrics and use of a software algorithm loaded in a physical processor, can classify the occupant's emotional state.

The present disclosure is directed to a vehicle system including an N size array of various biometric sensors, e.g., a heart rate monitor and electro-dermal potential (EDP) brain activity detection system. A heart rate monitor gathers data related to the cardiac activity of the vehicle occupant and can compute the heart rate variability (HRV) to calculate autonomic nervous system components relative activation (sympathetic/para-sympathetic) and evaluates the calculated results to determine the amount of physiological arousal. EDP measures the brain electrical activity associated with cognitive processing loads and patterns and/or spatial activations within the brain. The system can also measure galvanic skin response (GSR), perspiration, breathing, and blood pressure of the occupant, which can be used to classify the physiological and psychological status of the occupant, and increase overall reliability of the classification of the present system.

The sensed and derived data related to the occupant is fed into a processor that computes the status for each measurement, classifies it and then runs a cross-comparison to minimize instances of false-positive identification and thresholding. The EDP activation patterns, levels, and locations can be used in addition to determine type of stress or status of the occupant.

The system may then report the occupant's individual stress level and potentially the type of stress they are currently experiencing (e.g., processive versus systemic stressors). Environmental stressors regarding driving a vehicle can be either a processive stressor or a systemic stressor. Processive stressors are those that require appraisal of a situation or involve high-level cognitive processing of incoming sensory information. Examples of processive stressors may include driving in a new environment, poor driving (perceived or real) by other drivers, or situations that trigger fear because of previous association with unpleasant driving stimuli. In contrast, systemic stressors are of physiological origin, e.g., disturbances of normal bodily metabolism resulting from bacterial or viral infection.

At least some of the sensors in the present classification system can be integrated with the seat including one or more sensors embedded in any part of the seat, e.g., the foam, the trim, the headrest or a combination thereof. The contactless EDP sensing system can be supplemented by appropriate physiological metrics (e.g., heart rate, HRV, and the like), cardiorespiratory coupling/synchrogram (CRS), breathing rate, EDP pattern shift and the like, for both standard and complex non-linear dynamics of the seat occupant, e.g., the driver. A controller can receive the sensed physiological metrics relevant signals and classify the state of the occupant and, therefore, if attention and reaction time is affected. The controller can be adapted to individual occupants using an automated user-specific calibration.

This system can also include cameras strategically positioned to look at the driver. Inward cameras can be used in conjunction with the seat sensors to achieve sensor fusion and increase specificity and accuracy of the distraction level detection. The camera generates multiple images of the occupant, which can be analyzed to determine additional occupant metrics. The metrics can include head position, a blink rate, pupil dilation, eye position, fixation, gaze patterns, eyelid closure, head movement facial expression, overall skeletal position, breathing rate, heart rate, and the like. The camera system takes an image and image processing circuitry analyzes the image to determine the image metric.

The use of various metrics from different sources provides an objective quantification of distraction of the occupant. The distraction quantification can be combined with other data in the vehicle to prevent false indications of distraction, e.g., vehicle performance, driving environment, and the like. If the distraction quantification level exceeds a distraction threshold, then the vehicle may automatically trigger countermeasures, e.g., alerts, alarms, collision avoidance, and the like. If the distraction status of the driver is quantified, the vehicle can change reaction times of the collision avoidance system, e.g., the adaptive braking system, to optimize the response of the system itself in view of the driver condition as at least partly determined by the distraction level.

A vehicle system is described that uses at least two sensors sensing two criteria, which are different, when processed by a controller produces an indication of distractedness or focus of the occupant or driver. In an example, a first sensor senses a first criterion relating to distracted driving and controlled by the driver. In an example, a second sensor senses a second criterion relating to distracted driving and representing an environmental condition not controlled by the driver. A controller receives the first criterion and the second criterion and determines a relative relationship between the first criterion and the second criterion with the relative relationship exceeding a distractedness threshold to indicate distracted driving.

FIG. 1 shows a vehicle 100 including a cabin 115 and an engine bay 116, which can be forward of the cabin 115. The engine bay 116 houses a motor 101 that provides motive power to the vehicle. A controller 102 includes an electrical signal processor adapted to execute tasks, which can be stored in a memory. The tasks can process sensed signals according to rules loaded into the controller 102. The sensed data can be stored in memory associated with the controller 102.

Visual systems 103 are provided to receive instructions from the controller 102 and produce visual displays in the vehicle, e.g., in the cabin on display screens, the dashboard, a mobile electronic device associated with the vehicle. The displays produced by the visual systems can be images sensed by an internal camera 104, an external camera 105, collision warnings, distraction warnings, and the like. The visual system 103 can process the image data from the cameras 104, 105 before providing the image data to the controller 102. The visual system 103 can process images to identify objects and the position of the driver in an example embodiment. This data can be provided to the controller 102.

An audio system 106 can be part of a head unit in the vehicle. The head unit can be an electronic processor to process audio signals or sensed signals in the vehicle. The audio system 106 can sense audio in the cabin 115 and output audio into the cabin, e.g., using multiple speakers 114. The audio output from the audio system 106 can be warnings as described herein based on instruction from the controller 102. The audio warnings can be spoken words or tones to indicate driver distraction, change in settings, imminent danger, activation of collision warning system or combinations thereof. The audio system 106 can also include microphones to sense the speech of the occupant, which can be an input for classifying the stress level of the occupant. The audio system can play warnings, music, and/or soothing sounds when the emotional state of the vehicle occupant exceeds a threshold as will be described in greater detail herein.

A vehicle speed sensor 107 is provided to detect the speed of the vehicle and provide a speed signal to the controller 102. The vehicle speed sensor can include the throttle position sensor. The speed of the vehicle can be an input to classify the emotional state of the driver or other vehicle occupant.

A navigational position system 108 detects the position of the vehicle by receipt of satellite signals or ground based position signals. The navigational position system 108 can include a global navigation satellite system (GNSS) such as Global Positioning System (GPS), Beidou, COMPASS, Galileo, GLONASS, Indian Regional Navigational Satellite System (IRNSS), or QZSS. The navigational system can include a receiver that receives differential correction signals in North American from the FAA's WAAS system. The navigational position system 108 provides accurate position of the vehicle to the controller 102. The controller 102 can load information regarding the surrounding location of the vehicle and request real-time driving conditions for each segment of the calculated route. The presently described systems can then determine and indicate when current driving conditions are likely to trigger stress as determined by the neural network. Driving conditions can include the traffic that has been historically encountered or real-time traffic information. Real-time data about the social factors regarding the route can also be loaded into the controller, e.g., start times of cultural or sporting events. The driving conditions can include crime statistics for the route.

A distraction alarm 109 is positioned in the cabin 115. The distraction alarm 109 can include mechanical alarms like vibration devices that can be positioned in the steering wheel or the seat. The distraction alarm 109 can be a signal to vibrate a mobile electronic device associated with the vehicle and a passenger in the vehicle.

A vehicle seat 110 is positioned in the cabin 115 and is configured to support a person, e.g., a driver or a passenger. The seat 110 can include a plurality of sensors 150, 155, 156 to detect various biometric characteristics of the person. The sensors 150 can be contactless and can sense EDP adjacent the head of the seated person. The sensors 155 and 156 can detect other biometric information. The sensors 155, 156 can be contactless, e.g., sensing parameters from the occupant without physically contacting the occupant. In some instances, at least one of the sensors 156 can contact the occupant.

A brake system 111 is provided to brake the wheels of the vehicle. The brake system 111 can be activated by the driver and can also be activated automatically by the controller 102, e.g., when distracted driving is detected, a crash is detected as imminent, or an imminent danger is detected as described herein.

A laser sensing system 112, e.g., a LIDAR, is provided. The laser sensing system 112 emits light in pulses and detects the light returned after the light reflects off of an object external to the vehicle 100. The laser sensing system 112 can produce a digital three-dimensional representation of the external environment around the vehicle in the direction of the light pulses. The laser sensing system 112 can perform laser scanning to produce a representation around the vehicle. The external environment can include other vehicles, signs, animals, people, and other objects. The representation or individually identified objects can be provided to the controller 102 for use in the vehicle as described herein.

A RADAR sensing system 113 is provided in the vehicle. The RADAR sensing system 113 emits radio frequency energy pulses and detects the returned pulses to identify objects around the vehicle or map the external environment. The representation or individually identified objects can be provided to the controller 102 for use in the vehicle as described herein.

Other typical vehicle systems may be included in the vehicle 100 but are not illustrated for clarity of the drawings. The controller 102 may provide inputs to these other systems.

Figure 2:
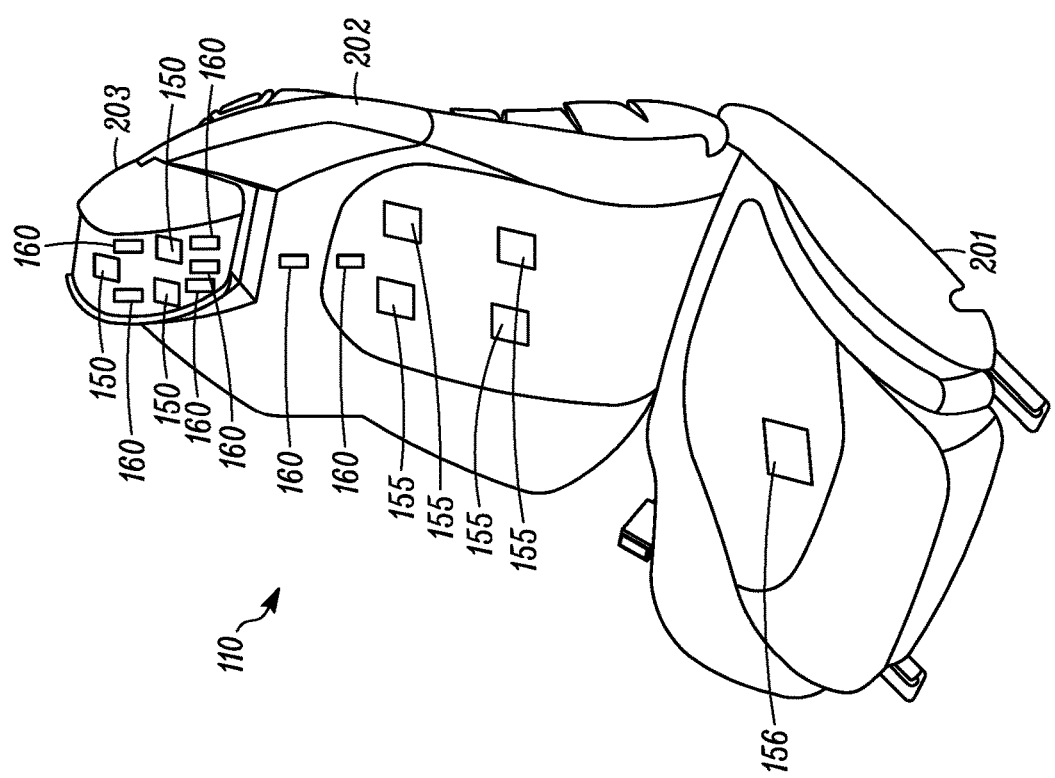
FIG. 2 is a schematic view of a vehicle seat with sensors therein according to an example embodiment.

FIG. 2 shows the vehicle seat 110 configured to be fixed in a cabin of a motor vehicle 100. The seat 110 is adapted to support an occupant, e.g., a person on a base 201 in an upright position against a seat back 202. The base 201 is fixed to the floor in the vehicle cabin, e.g., by rails. A head restraint 203 may be positioned at the top of the seat back and act as a headrest. Each of the base 201, seat back 202, and head restraint 203 include a rigid frame, comfort layers on the frame and an external covering. A plurality of sensors 150, 155, 156 can be supported in the seat. A plurality of first sensors 150 may be positioned in the headrest 203 and adapted to sense at least one of central nervous system (CNS) signals, sympathetic nervous system (SNS) signals, autonomic nervous system (ANS) signals, and parasympathetic nervous (PNS) signals from the occupant of the seat 110. A plurality of second sensors 155 may be positioned in the seat back 202. The plurality of second sensors 155 may also sense at least one of CNS, SNS, ANS, and/or PNS signals from the seated occupant. The plurality of second sensors 155 may include at least one sensor that senses different signals than the head restraint sensors 150. One or more third sensors 156 are positioned in the seat base 201. The third sensors 156 may also sense at least one of CNS, SNS, ANS, or PNS signals from the seated occupant. The plurality of third and second sensors 156 and 155 may include at least one sensor that does not sense at least one of CNS, SNS, ANS, or PNS signals from the seated occupant. The sensors may be position or weight sensors to sense the presence and position of a person in the seat using sensors in the seat back or seat base. The sensors 150, 155, 156 can develop raw CNS, SNS, ANS, and/or PNS signals, which are filtered to produce analysis signals including frequency components relevant to the signals of interest of the occupant in the seat while attenuating unrelated frequency components. Emitters 160 can be provided that emit stimulation signals to the occupant. The emitters 160 can be non-contact emitters in the seat to stimulate the occupant to return the occupant to a calm state or an alert state.

In another aspect, a method is provided for monitoring a mental state of a person having a body on the seat base 201 and seat back 202 with the occupant's head positioned at the head restraint 203 adjacent to sensors 150 in the head restraint 203. The method also includes positioning a sensor at least proximate to portions of the skin of the body below the head to develop raw signals, and processing the raw signals to produce at least one bandpass-filtered state-indicating signal representative of raw signal magnitude within a predetermined frequency range as an indication of the mental state (e.g., distracted state) of the person.

At least one sensor 150 is positioned to be at the posterior of the head near or at the occipital-visual cortical region. This may assist in accurately measuring brain waves, e.g., through EDP. As driving is a visually dominant cognitive task the ability to detect processing in that anatomical area of the brain (e.g., the visual cortex) as well as other processing and cognitive networks of mental processing offers the ability to monitor visual attention level specifically. For example, visual habituation is the brain's ability to decrease its response to repeated stimuli once the information has been processed and is no longer perceived as a relevant processing demand. In addition to generally low visual attention, the occupant should not experience significant habituation patterns as the visual scenery though mundane at times is in continuous variation and the conditions demand attention in such areas. Lack of activity related to visual processing or habituation of visual stimuli can serve as a subset classification of potential distraction in addition to other brain wave responses and secondary monitoring systems.

The various sensors can provide an N size array of biometric sensors that measure signals for at least the CNS function of the vehicle occupant and in some aspects measure signals for the other biometric signals of vehicle occupant. The other biometric signals can be at least one of PNS, ANS, SNS, PNPS and/or biochemistry for increased accuracy in detecting the emotional stage of the occupant. As described in more detail below, the signals are fed into signal processing units that are part of the neural network with appropriate artifact correction being run for each type of sensed signal. The neural network processes the signals in a first layer individually for a variety of bio-functional markers of valence and arousal. Each layer has individualized machine learning logic trees to remove single-metric and subjectivity uncertainty and improve accuracy. The outputs of these initial layers are fed into a second layer and, if required, subsequent layers of the neural network where they are assessed in sub-combinations or total combination. Each combined layer has a deeper machine learning logic tree that further removes single metric and subjectivity uncertainty improving accuracy. The neural network can use weighting logic based on the fidelity of the signal and processing technique to estimate a confidence coefficient of the assessment level for each network to improve reliability. The final valence/arousal levels are computed and can be used to inform the occupant or alter performance parameters in the vehicle.

The sensors can also sense data relating to the somatic nervous system, i.e., voluntary muscle and skin activity. These sensors can be electromyography sensors to sense electrical activity in the muscles. The sensors can be galvanic response sensors, which sense electrical resistance on the skin. These sensed signals can be fed to the neural network 310.

Figure 3A:
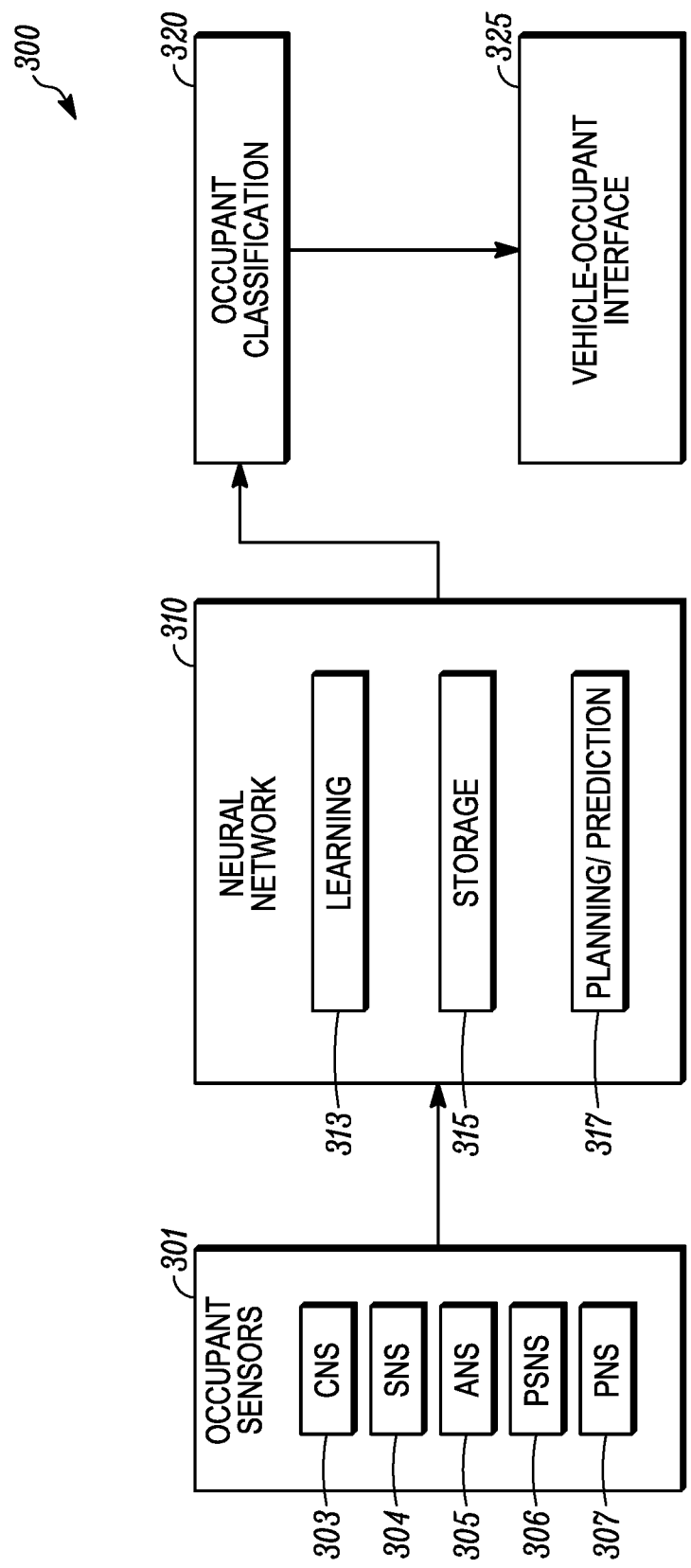
FIGS. 3A and 3B show functional block diagrams of a vehicle system according to an example embodiment.

FIG. 3A shows a schematic view of a system 300 that can be implemented to classify emotional state of an occupant, e.g., a vehicle occupant who is in a vehicle seat. A sensor array 301 can monitor a driver or an occupant of the vehicle seat and is positioned in a vehicle and can include any sensors described herein. The sensor array 301 can monitor the occupant using central nervous system (CNS) sensors 303, sympathetic nervous system (SNS) sensors 304, autonomic nervous system (ANS) sensors 305, parasympathetic nervous system (PSNS) sensors 306, and peripheral nervous system (PNS) sensors 307. These sensors can be placed in the vehicle cabin, e.g., in the seat, the steering wheel, door, A pillar, B pillar, or other locations in the vehicle that can interact with a vehicle occupant. The CNS sensor 303 is configured to sense signals related to the brain and the spinal column of the occupant. The ANS sensor 305 is configured to sense the occupant's physical state that relate to unconscious bodily functions, e.g., heart rate, digestion, respiratory rate, pupillary response, salivary gland operation, urination urgency, and sexual arousal. The SNS sensor 304 can sense an occupant's fight-or-flight response, which can be measured as a change in the occupant's heart rate, constriction of blood vessels, and change in blood pressure. An increase in the heart rate and an increase in blood pressure may indicate a possible agitation of the occupant. The PSNS sensor 306 can sense the occupant's state with regard to the parasympathetic system which is responsible for stimulation of digest, rest, feed or other activities that occur when the body is at rest, especially after eating, including sexual arousal, salivation, lacrimation (e.g., tears), urination, digestion and defecation. These sensors can be placed at locations where the occupant's nerves output signals that relate to at least two of the ANS, SNS, CNS, and/or PSNS electrical signals in the occupant's body. The PSNS sensor 306 can sense the occupant's craniosacral outflow. The SNS sensor 304 can sense the occupant's thoracolumbar outflow. The PNS sensor 307 sense electrical signals in the occupant's body outside the central nervous system and can sense signals to move muscles, e.g., twitching, nervous mannerisms and the like.

A neural network 310 receives the sensed data related to the occupant(s) from the occupant sensors 301. The neural network 310 can include various algorithms in hardware processors. The neural network 310 operates as a computing system that is self-learning to progressively improve performance of classifying an occupant's emotional state, by executing the algorithm to consider examples of the input in view of the occupant's state. The neural network 310 can learn to identify emotional states of the occupant and the sensed data relating to the occupant. Over time, the neural network can evolve its own set of relevant characteristics of an individual occupant from the input data, i.e., the sensed occupant data, and the occupant state. The neural network 310 can include a plurality of connected nodes that can be organized in layers with nodes between layers being connected together with outputs from one layer being inputs to nodes of another layer. The first layer may receive the raw data signals from the occupant sensors 301. Different layers may perform different kinds of transformations on their inputs. Signals travel from the first (input) layer, to the last (output) layer. Feedback connections can transmit an output signal from a subsequent layer to a prior layer. Thus, a signal or data being processed may traverse the layers multiple times before an output is determined. In some instances, the neural network may itself reconnect nodes based on its self-learning. Each node in the neural network may perform a calculation on the inputs, e.g., a non-linear function of a sum of its inputs. Nodes may also include a weight that adjusts its output relative to its importance relative to the output of other nodes. The non-linear function, the sums and the weights can be changed as the neural network 310 learns. In an example, the weight increases or decreases the strength of the signal output from the node that the neural network 310 sends across the next layer The weight(s) can be initially set by a predetermined score based on relevance of a particular feature relative to all other features that can be extracted. In an example, a first sensed signal may contain an artifact of a second sensed signal. The neural network 310 can remove the artifact of the second sensed signal from the first signal. An EEG signal may contain artifacts of the ECG within its signal, particularly, a distinguishable R-wave. The neural network 310 can remove the artifact of the ECG signal from the EEG signal. In this case, the ECG signal is a repeating spike that has an amplitude that greatly exceeds, e.g., at least twice the amplitude, the EEG signal.

The neural network 310 can operate to cross-validate of heart activity via sensor fusion using a positive identification of the R-wave in the ECG. The sensed signal can be the PQRST waveform. The P wave, QRS complex and the T wave represent electrical activity in the heart in an ECG. The P wave represents the depolarization of the right and left atria. The QRS complex waveform follows the P wave and depicts the activation of the right and left ventricles. The T wave indicates repolarization of the ventricles. The R-wave would rank most important among the ECG features with the other peaks of the PQRST waveform ranking lower in order of peak prominence. For example, the rankings can be from highest to lowest, 5=R, 4=T, 3=P, 2=S, 1=Q. This is because while the other waves can provide perspective to the activity and the probable location of the same feature between sensors a direct a one-to-one comparison of the same feature, which is an optimal way to compare signals. Additionally, the more prominent the feature in the sensed signal, the more confident the neural network 310 is that the sensed signal is indeed a real feature that the systems can detect and process.

In another example, the signal to noise ratio (SNR) of a particular sensor can be used as a weighting factor. For instance, with an ECG the network 310 can assume that the prominence of a feature (e.g., sub-wave of the PQRST complex) and knowhow the sensed signal is affected by the SNR. As the SNR increases the features become more distinguishable. Conversely, as the SNR decreases the feature in the sensed signal become less distinguishable and the features that have the lowest prominence such as the Q-Wave relative to the R-Wave would become harder to positively identify with confidence, relative to each other. Initially, this can be computed by comparing the calculated SNR at that moment in comparison to the system validation SNR measured when the system was tested at the factory, e.g., if during assembly the SNR was measured at 16 dB and in real-time it is measured at 14 dB we can generate a weighting factor as a fraction of those two at that point in time $^{14}/_{16}$ or 0.875 across all features and then each feature is scaled again based on its relative prominence rank. As the system captures N+1 complexes we could update this weighting factor based on the change in SNR relative to the prior complex detected, e.g. 14 to 11 to 16. This multilayer approach of the SNR is fed into an activation/transfer function that thresholds at each level of the neural network 310. The feature extraction algorithms may detect all components of the PQRST but the activation function may threshold out all but the R-Wave based on the weighting factors. The neural network 310 includes error backpropagation to update these weight factors more intelligently by using the highest quality samples as training sets. An autocorrelation method in the neural network 310 can be employed in this case to replace the initial assumptions and initial weights so that the neural network 310 is updated to match the actual vehicle (e.g., the sensors and communication channels) and the most likely occupant as opposed to a generic model. Thus, the neural network 310 learns as it is used. When the training set for neural network 310 reaches a specified number of quality samples for each feature, complex, or both, the neural network 310 adjusts its weighting function toward an autocorrelation method where the weighting factor is a value based on the correlation coefficient of that new feature when correlated to that training data. This way generic feature assumptions do not bias the weights. Additionally, the SNR is automatically considered in the autocorrelation as reductions in SNR would reduce the coefficient and increases wouldn't bias the weights incorrectly.

For the complex based approach in neural network 310 (e.g., multiple coupled features), the identification and confidence of identification of the various features of the same complex can provide a means of generating a weighting factor to stop both false positives and false negatives. The neural network 310 can address false negatives using a strong confidence in the identification of the QST waveform in the ECG that can override a weak identification of the R-wave in the EEG, which might lead to rejection of the detection overall. In this situation the confidence of the detection of a heart signal is not affected by a disagreement between sensors when the confidence of a signal sensor is sufficient enough, i.e., the weights are high enough to pass the single sensor level activation level (neural network function) even if they are not high enough to pass the primary fusion level activation level. In these cases rejected data is back-feed to a secondary single level activation level (neural network function) with a higher threshold than the initial function. If these rejected signals pass that threshold alone we can have confidence that one sensor was sufficient enough in this case to determine a positive detection.

The neural network 310 can include a learning module 313 that is programmed into the layers with nodes. The learning module 313 includes nodes and layers to receive input from the sensors 301 and learn by adjusting the connections between nodes and layers (e.g., flow of data through the neural network) and the functions and weights at the nodes. The results of the learning module 313 are stored in a storage 315, the storage can be a digital memory. A planning and prediction module 317 receives the data from the storage 315 and the data from the sensors 301 to classify the occupant's emotional state. The planning and prediction module 317 operates with a processor executing the results, e.g., a predictive algorithm from the learning module 313 using the current sensed data from the occupant sensors 301. The output from the planning and prediction module 317 is the occupant's emotion state classification 320. In an example, the occupant's current emotional classification 320 can be stored in storage 315 and output from the neural network 310, e.g., into the other vehicle systems. The vehicle can use the occupant classification 320, in some instances, trigger a vehicle-occupant-interface 325 to interact with the occupant. Example of vehicle-occupant-interface 325 that can be triggered by the occupant classification 320 include, the audio system to play soothing music or an audio message, the video system to show a message or a soothing image, control the climate control system, operate seat cooling, heating, message, vibration or the like.

In an example, the CNS sensors 303 can include EDP sensors using the contactless sensors, e.g., sensors 150. The EDP signals are used to detect a distraction state of the driver. The EDP signals can be separated into various sub-signals, e.g., at different frequencies, by using filters to allow certain divisions into sub-bands. These sub-bands may overlap in frequency ranges. A general range of frequencies for each sub-band can be defined within a reasonable variance. A first sub-signal can be up to four hertz. A second sub-signal can be four hertz to seven hertz. A third sub-signal can be seven hertz to fourteen hertz. A fourth sub-signal can be fourteen hertz to about thirty hertz. A fifth sub-signal can be about thirty hertz to about one hundred hertz. Other sub-signals may overlap these ranges for the first through sixth sub-signals, e.g., from eight hertz to thirteen hertz. The relationships between these sub-signals can be used to determine whether the driver is distracted from the task of driving. The patterns of the sub-signals or the ratios of multiple sub-signals to each other can be used to determine if a distraction is occurring.

The occupant sensors 301 can include a vehicle cabin imager, e.g., a camera, that is used to detect the driver in the vehicle seat. The camera data is used to detect occupant physical characteristics, e.g., muscle movement, eye movement, breathing patterns, and the like. The camera can detect movement or lack of movement of the driver, facial features of the driver or both. The camera data can be video signals sent to a data processor in the vehicle and then to the neural network 310.

The vehicle cabin imager can be fixed in the vehicle cabin, e.g., in the dashboard of the vehicle, directed at the vehicle occupant. The imager can monitor the facial expression of the vehicle occupant, e.g., the driver. The imager or other processor with access to the image data from the imager, can monitor change in facial expression of the vehicle occupant, e.g., eyeball movement, contraction, and expansion. The changes in facial expression can be an input to assist in determining the mood or the state of the vehicle occupant. Examples of state can include angry, sad, happy, drunk, distracted drowsy, and the like. In an example, the determined mood can be an input into the neural network to more precisely determine the occupant state. The determined state can also be used to adjust the interior lighting, adjust audio or otherwise change the occupant's environment in the vehicle cabin. The audio can trigger certain songs or messages based on the determined mood. The audio can also suggest to the occupant through prerecorded messages that a certain sing be played from a preselected list of songs that may change the state of the occupant. The images from the camera may also be analyzed and determine that the occupant may be intoxicated, which can be a form of distracted driving. If the occupant is determined to not be in a suitable state for driving the vehicle, then the vehicle can trigger an automated message through a communication system to the driver's mobile device or to a family member's mobile device. This intoxicated state can also be an input into the neural network to take into account the occupant's altered state.

Figure 3B:
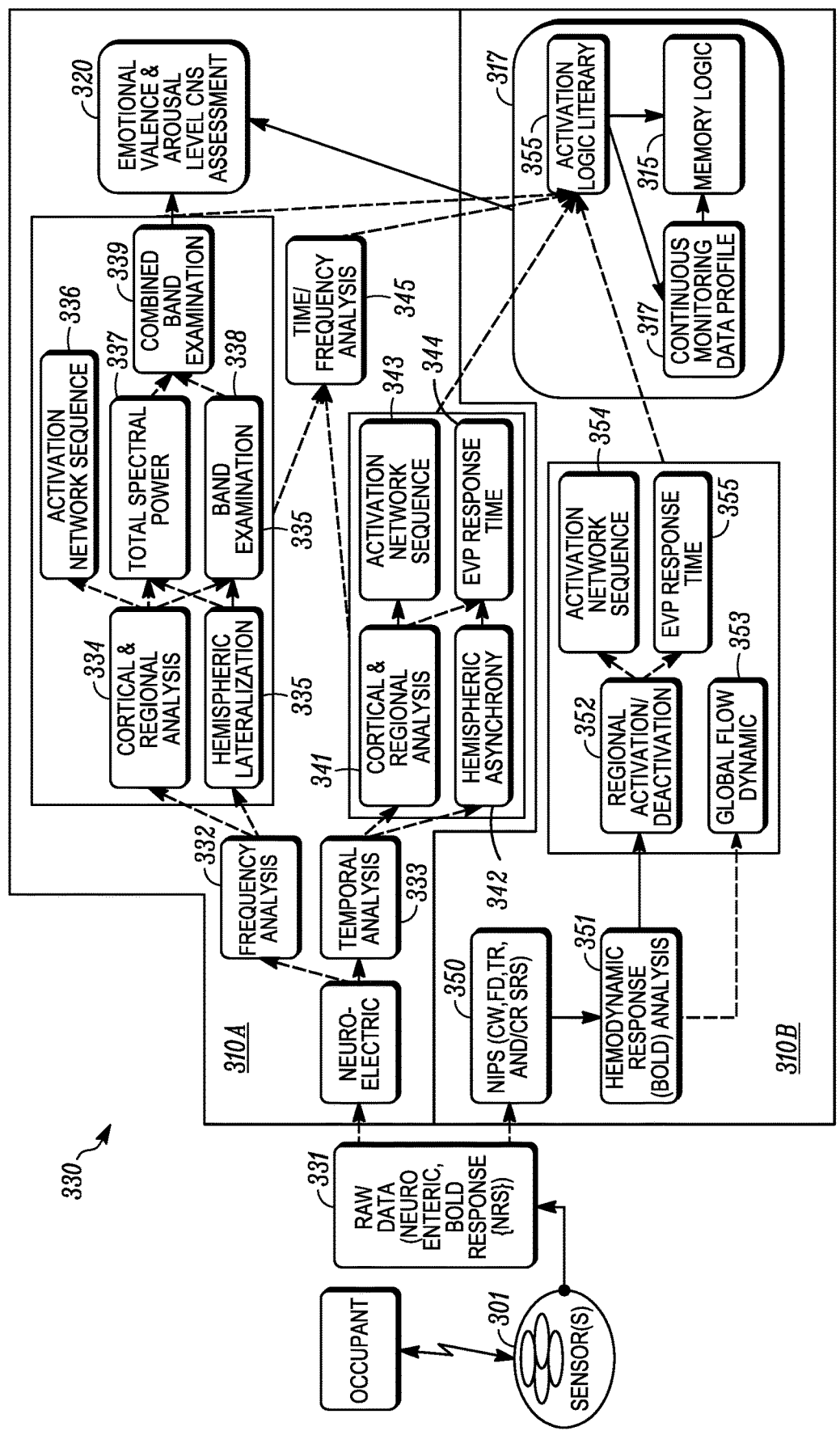

FIG. 3B shows process 330 that can be implemented in the neural network in the vehicle 100. Sensors 301 output raw data 331 including neuroelectric signals from the sensors 303-307, blood oxygen level dependent response signals, near infrared spectroscopy data signals and the like to the neural network 310. The raw data can be stored in the storage 315. The neural network 310 feeds the neuroelectric signals to a first set of neural network nodes 310A that are implementing a neural network algorithm for neuroelectric signals. The neural network 310 feeds the blood oxygen level dependent response signals and near infrared spectroscopy data signals to a second set of neural network nodes 310B that are implementing a neural network algorithm for non-neuroelectric signals. The first set of neural network nodes 310A are configured to divide the neuroelectric signals into a frequency analysis 332 and a temporal analysis 333. The frequency analysis 332 performs a cortical and regional analysis 334 and a separate hemispherical lateralization 335, which recognizes that certain neural functions or cognitive processes tend to be more dominant in one hemisphere of the brain relative to the other hemisphere. In an example, certain mood and emotional states of the occupant can be indicated by certain neuroelectric signals in one brain hemisphere. The output from the cortical and regional analysis 334 is fed to a further layer that includes three nodes directed to an activation network sequence 336, a total spectral power sequence 337 and a band examination 338. The hemispherical lateralization 335 can be fed to the total spectral power sequence 337 and the band examination 338. The total spectral power sequence 337 and the band examination 338 is fed to a combined band examination 339.

The temporal analysis 333 is fed to a cortical and regional analysis 341 and a hemispheric asynchrony 342. The cortical and regional analysis 341 is fed to an activation network sequence 343 and an EVP response time 344. The hemispheric asynchrony 342 is fed to the EVP response time 344. A time/frequency analysis 345 receives data from any of the cortical and regional analysis 334, the separate hemispherical lateralization 335, the activation network sequence 336, the total spectral power sequence 337, the band examination 338, the combined band examination 339, the cortical and regional analysis 341, the hemispheric asynchrony 342, the activation network sequence 343 and/or the EVP response time 344.

A near infrared spectroscopy level 350 includes a plurality of processing nodes, which can evaluate the signal for continuous wave analysis, frequency domain analysis, time resolved analysis, spatially resolved spectroscopy analysis and the like. The near infrared spectroscopy level 350 feeds its output to a hemodynamic response analysis 351. The output is fed to two different levels of regional activation/deactivation 352 and global flow dynamic 353. The regional activation/deactivation 352 is fed to an activation network sequence 354 and an EVP response time 355. Each of the feeds described herein can be from a level including a plurality of nodes and fed to another level with a plurality of nodes within the neural network. The planning and prediction module 317 can include components as shown in FIG. 3B. An activation logic library level 365 in the module 317 receives outputs from any of the prior levels to provide a classification of the emotional state of the occupant in the vehicle. The activation logic library level 365 outputs its results to the memory logic level, which, acts a data storage 315 and the learning module 367, which includes a continuous data profile monitor level that stores the learned model of the various signals, level outputs that indicate the emotional state of the occupant.

It will be appreciated that a similar schematic structure can be used for the other signals from the ANS, SNS, CNS, and/or PSNS sensors. The neural network 310 can use sensed signals from more than one type of sensor.

Figure 4:
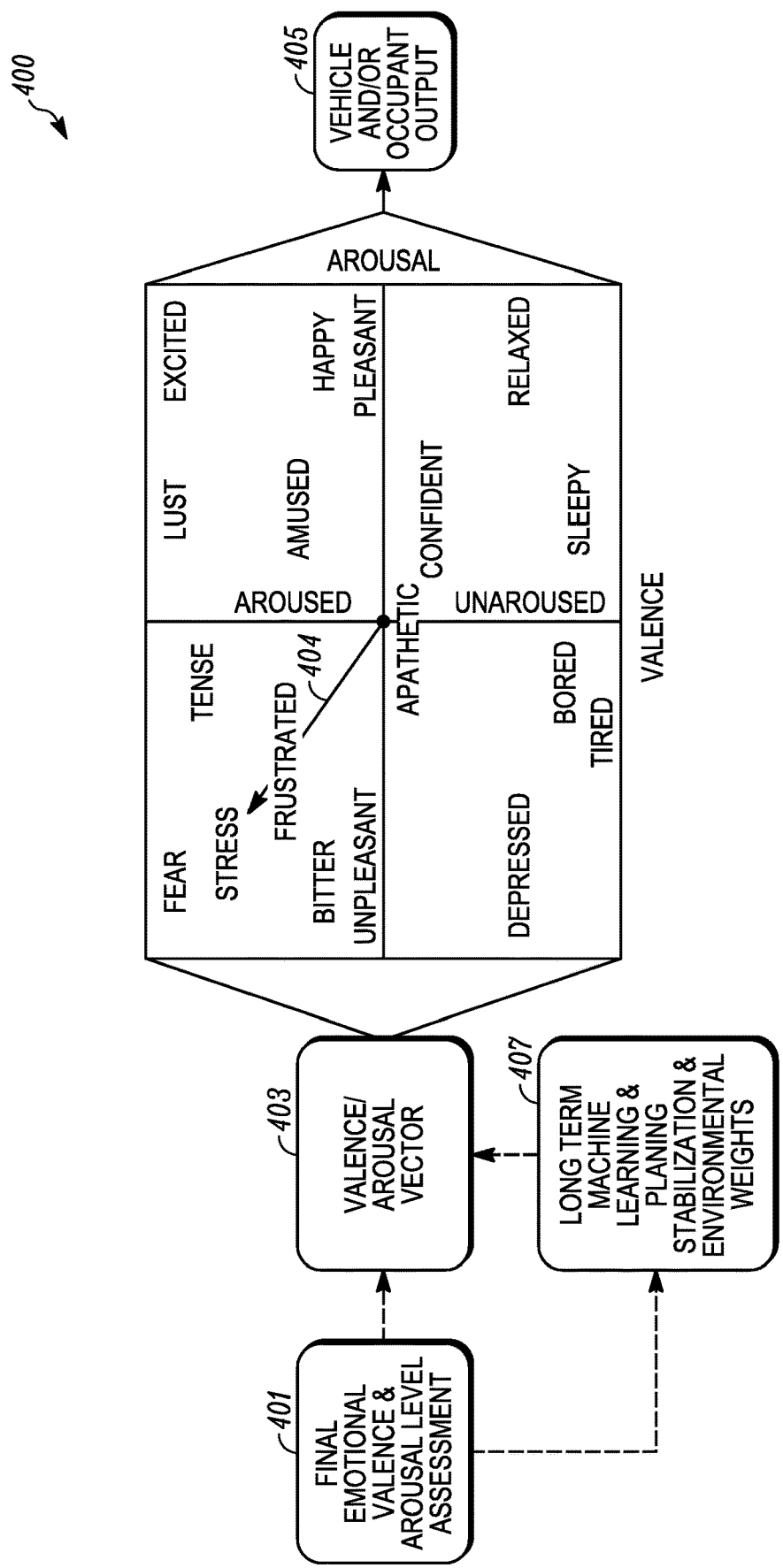
FIG. 4 is a schematic view of a vehicle system according to an example embodiment.

The output of the emotional classification of the occupant at 320. The emotional classification can include the emotion valence and the arousal level components. FIG. 4 shows the emotion valence and the arousal level components in greater detail. When the occupant classification is determined, then the vehicle can take action via a vehicle-occupant-interface 325 to warn the occupant of their state, provide stimulation to return the occupant to a non-agitated or alert state, alter vehicle performance parameters, or combinations thereof. The vehicle-occupant-interface 325 includes a display in the vehicle cabin on which a warning of the occupant state can be displayed and/or an audio warning from the infotainment system of the vehicle. The vehicle-occupant-interface 325 can include stimulation systems to stimulate the occupant to move the occupant from an agitated state to a calm state or from a drowsy state to an alert state.

Long term data related to detected distraction can be processed secondary to the real-time algorithms to provide a variety of statistical information for both the occupant and machine learning systems. The long-term data may be stored in the vehicle or off-vehicle on a remote server. The vehicle may include electronic communication to an external server, e.g., over WIFI, mobile communication networks, such as cellular communications, and the like. The long-term distraction calculations may be used to alter the instructions for determining distraction or for mitigating false positives. The present disclosure quantifies the distraction/concentration status of the driver while correcting for false indications of distraction. The vehicle can use the distraction/concentration status of the driver to manipulate reaction times of various vehicle safety systems, e.g., the adaptive braking system, to optimize the response of the system itself. This may reduce the risk of forward collisions.

Figure 3C:
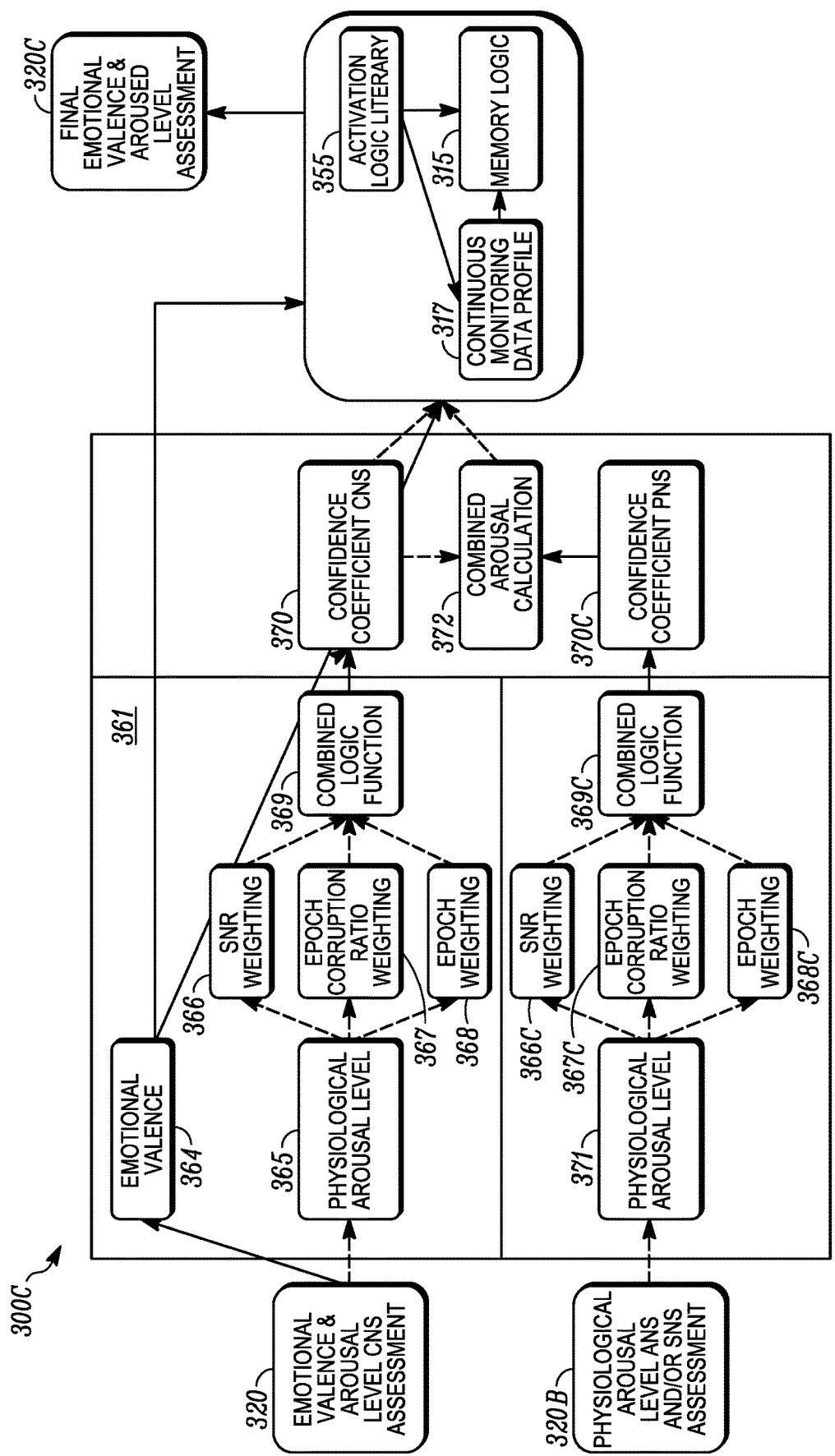
FIG. 3C shows functional block diagram of a vehicle system to combine vehicle occupant determined data according to an example embodiment.

FIG. 3C shows a process 300C that processes multiple neural system inputs from the sensors associated with the occupant, here shown as emotional valence and arousal level based on sensed data from the CNS sensor and physiological arousal level from the sensed data from the ANS sensor and/or the SNS sensor. The process 300C includes a first path 361 for the first sensed state of the occupant input and a second path 362 for the second sensed state of the occupant. In an aspect, the first path receives data relating to brain function. The second path receives data relating to PNPS, ANS, SNS, body biochemistry or combinations thereof. The first path 361 receives the emotional valence and arousal level 320, e.g., a vector as described herein, based on the CNS sensed data. The second path 362 receives the physiological arousal level 320B based on non-CNS sensed data, e.g., based on the ANS or SNS data. The emotional valence and arousal level 320 and the physiological arousal level 320B can be both supplied by prior levels of the neural network. The emotional valence and arousal level 320 is split into its emotional valence component 364 and its physiological arousal level 365. The emotional valence 364 is fed to the monitoring and end level of the neural network without further processing, i.e., it skips the weighting level(s). The physiological arousal level 365 is further processed in a weighting level of the neural network. A signal to noise weighting 366 operates to provide a weighting to the quality of the signal, e.g., less noise a greater weighting and greater noise the less weighting. An epoch corruption weighting ratio 367 operates to weight the input based on the whether any individual cycle being computed in the neural network is likely to be corrupted. The epoch weighting 368 is performed and can weight successive cycles greater than prior cycles in recursive computations in the neural network. The weightings 366, 367, and 368 are fed to a logic level 369 to combine the results. The combination logic function 369 outputs a confidence coefficient 370 in the input, here, the physiological arousal level, into the first path 361. The second path 362 receives a physiological arousal level 371 from the other, non-CNS assessment of the occupant. The physiological arousal level 371 is processed through the same type of processing as the CNS arousal level, namely, signal to noise weighting 366C, epoch corruption ratio weighting 367C, and epoch weighting 368C (the processing is designated using the same reference numbers with the suffix C). The weightings 366C, 367C and 368C are combined at a combination logic function level 369C, which outputs a confidence level 370C for the input to the second path 362. The confidence level is the level of the physiological arousal of the ANS or SNS assessment. The combined arousal calculation level 372 combines the confidence levels 370, 370C to output an overall confidence level to the output stages for further processing or storage, which can each individually adjust the final emotional valence and arousal level 320C associated with the occupant of the vehicle. The processing at 300C computes a combined vector 320C based on a final valence/arousal level(s) from each type of sensed signal. The combined vector 320C represents the emotional state of the occupant. The combined vector can be fed into a further artificial intelligence logic tree, e.g., within the neural network in the vehicle, that uses long term information to take the occupant individuality into account for stabilization and environmental impacts to further improve weighting in varying surrounding trends. The final vector 320C or other outputs based on the calculations can be used in other vehicle systems to trigger or suggest preemptive countermeasures. Additionally, a long-term trend analysis and short-term variability can be used to offer occupants an indicator of changes (stabilization or degeneration) of their emotional health.

The neural network layers are generally shown in vertical alignment in FIGS. 3B-3C. It will be recognized that each of these layers may include numerous nodes and sub-layers to provide the processing described herein.

The sensors described herein can sense various characteristics of the vehicle occupant. The sensors can sense electroencephalograms (EEG), Electrocardiogram (ECG), Heart Rate Variability (HRV), Galvanic Skin Response (GSR), Muscle Activity or Electromyogram (EMG), Skin Temperature (SKT), Blood Volume Pulse (BVP) and Respiratory Volume (RESP).

FIG. 4 shows a schematic view 400 of valence/arousal vector that can be used in the present disclosure. At 401, the systems and methods described herein determine the emotional valence and arousal level using the neural network. At 403, a valence/arousal vector is produced. The valence/arousal vector is plotted on a X/Y coordinate system that can have pleasure increasing the positive X direction and decreasing in the negative X direction. The arousal state of the occupant increases in the positive Y direction and decreases in the negative Y direction. The base emotion states are labeled in the quadrants. When the occupant is extreme in any quadrant, then the occupant may be notified or stimulated to return more toward the center of the graph. A sample vector is shown at 404. Here is may be desirable to reduce the magnitude of the vector 404. A large magnitude arousal state may indicate that the occupant is fearful or angry or is drowsy or distracted. At 405, an output to the occupant of the vehicle is produced in an attempt to return the occupant to a calm and alter state, which can be indicated by the reduced magnitude of the vector 404, which in turn is determined in the neural network based on real time sensed data in the vehicle. At 407, the neural network can receive the valence/arousal vector and use the determined vector in neural network learning, planning and weights applied to the nodes in the neural network.

Figure 5:
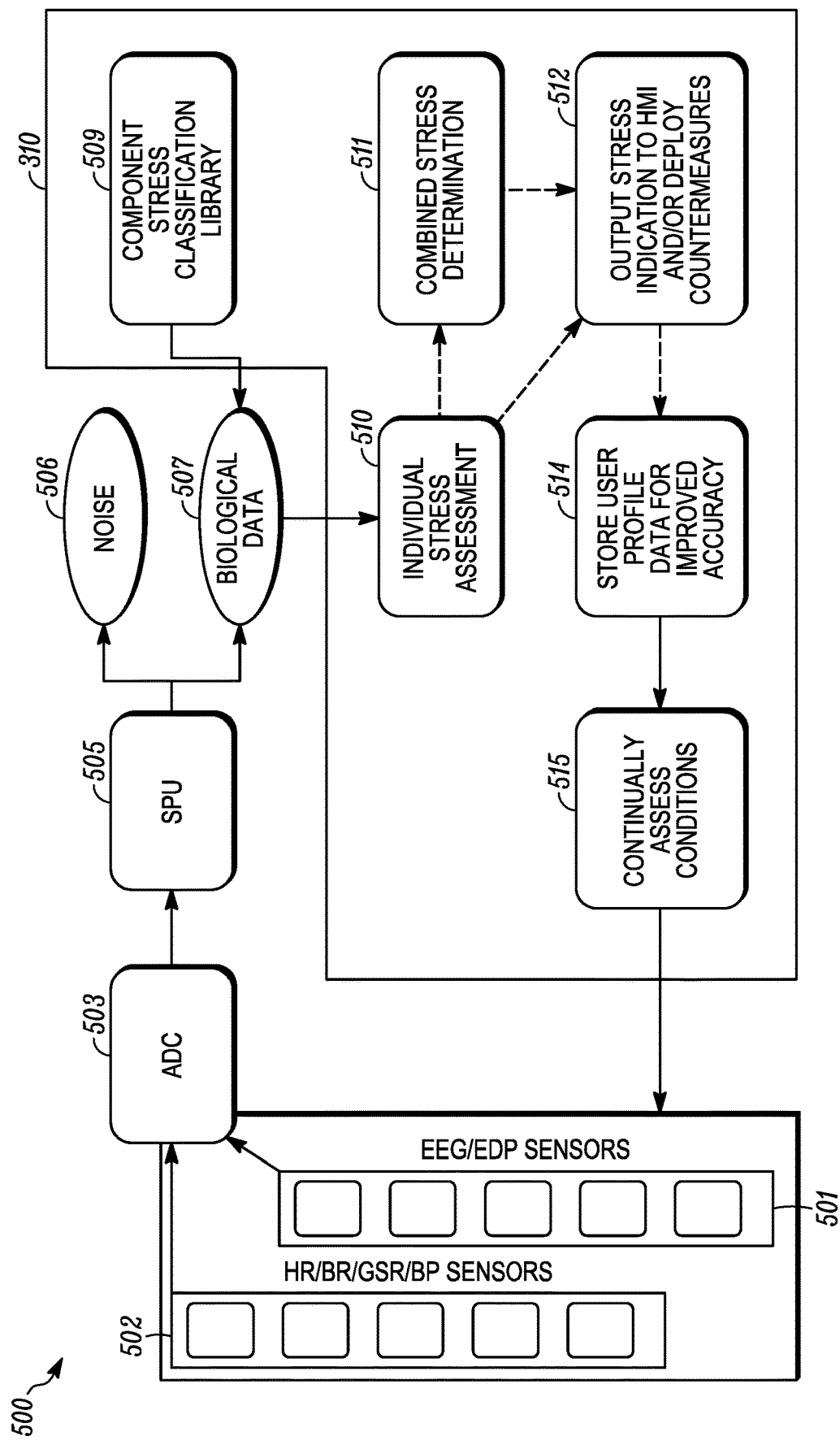
FIG. 5 is a schematic view of a vehicle system according to an example embodiment.

FIG. 5 shows a vehicle system 500 for sensing various characteristics of the vehicle occupant. A plurality of electromagnetic sensors 501 are configured in the vehicle cabin to sense the electrical signals in the body of the occupant. The sensors 501 can be positioned in the vehicle seat or in locations in the vehicle cabin adjacent the occupant. The sensors 501 can be closely adjacent, but not in contact with the occupant. The sensors 501 can measure EDP, EEG and the like, e.g., the brain electrical activity as a whole and segments, into frequency bands to determine load, level, and location. This information is used to assess the cognitive function of the occupant and determine several conditions including stress. A plurality of physiological sensors 502 are configured in the vehicle cabin to sense the other characteristics of the occupant. The sensors 502 can be closely adjacent, but not in contact with the occupant. The sensors 502 can measure heart rate, breathing rate, blood pressure, galvanic skin response, and the like. The sensors 502 can include heart sensors to measure ballistic, seismocardiogram, and/or electrical signals generated by the heart which are fed into an algorithm to determine the heart rate, and heart rate variability value(s), which correlate to autonomic arousal levels. The sensors 502 can also galvanic skin response measures the skin reactivity to the stressors or lack thereof while breathing rate helps to determine the intensity and reaction to the stressor. The rise in blood pressure helps to indicate vasoconstriction and heartrate increase. The sensors 502 can be positioned in the vehicle seat or in locations in the vehicle cabin adjacent.

The sensors 501, 502 feed the sensed signals to an analog to digital converter 503, which in turn can send the digital sensed signals to a signal processor 505, which can include a processor and memory operably connected to the processor. The signal processor 505 processes the signals to reduce and/or eliminate the noise component 506 from the sensed signal. The signal processor 505 outputs processed biological data relating to the occupant. The biological data 507 can be fed to the neural network 310 to produce the emotional valence and arousal level (e.g., the vector) and to classify the emotional state of the occupant.

In an aspect of the present disclosure, a system 500, the neural network can include a component stress library 509 that is stored in memory. The component stress library 509 includes a plurality of selections of the various sensor data, e.g., any data from the sensors 501 and 502, that is useful in determining the emotional state of the vehicle occupant. The library profiles 509 can also be selected based on the reliability of the sensed data for any individual occupant. An individual stress or emotion state assessment 510 is performed using the occupant data 507 that is indicated in the profile from the library 509. The assessment 510 can include any of the neural network steps described herein. The individual state assessment 510 can also process the biological data individually. When computed individually, the stress determinations can be combined using layers in the neural network at 511. This combination 511 improves the reliability of the emotional state or stress assessment. The resulting combined assessment at 511 can be sent to a device 512 to output the result to an occupant interface in the vehicle. Optionally, some individual assessments from 510 can trigger an output to an occupant interface at 512. A user profile storage 514 receives the assessments and the outputs to the occupant. The neural network can use the historical results for any individual occupant or a group of occupants to train the neural network or to use the past results as a check on the accuracy of the current assessment. The control module 515 can begin the sensing or control the operation of the sensors 501, 502 such that the vehicle occupant can be continuously monitored in real-time. A change in the sensed characteristics from the sensors can change the assessment at 510 and change an output to the occupant.

The system 500 using two types of sensed data such as biometrics and neurocognitive signals can provide greater specificity of the emotional state or stress classification of the occupant than using a single input, i.e., the presence, level and type of stress can be determined with greater specificity than using any individual sensed component. The system 500 integrates physiological and psychological data from two or more biometric devices boosting the accuracy and increasing the resolution in determining the stress level of an individual occupant. Specifically, the system can cross-correlate neurocognitive processing loads and patterns acquired by second sensors 502 with relative activation levels of the parasympathetic/sympathetic nervous systems, as detected by heart rate variability, in the first sensors 501. In an example, the system 500 combines the sensitivity of the heart rate variability measurements with the specificity of EEG/EDP. The increased heart rate may indicate arousal or stress that high in valence and should not indicate stress or anger while driving. That is, in some instances heart rate alone or variable heart rate is not an accurate indicator of an undesirable occupant state. Combining this result with the analysis for the data from the first sensors 501 will indicate whether the occupant is excited in a non-adverse way, e.g., happy/excited versus stressed or fearful. The use of the combination may increase the accuracy.

Figure 6:
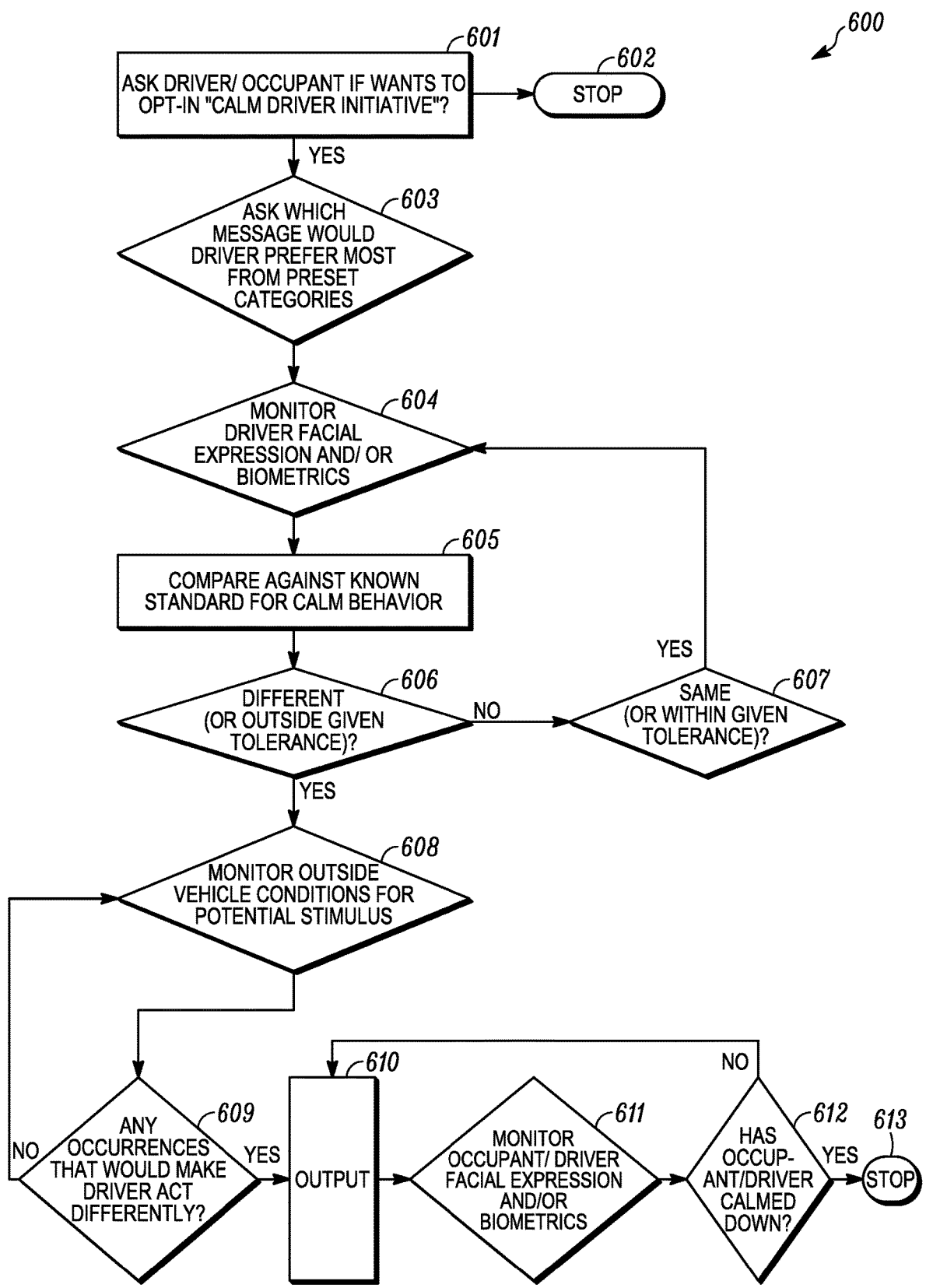
FIG. 6 is a schematic view of a vehicle system according to an example embodiment.

FIG. 6 shows an in-vehicle method 600 for using the emotional state determinations to calm the occupant. The use of the present systems 100, 300, 500 to determine the emotional state of a vehicle occupant may not be wanted by all occupants. Moreover, certain actions may increase the stress to an occupant. At 601, the vehicle requests input from the occupant, e.g., the driver, if the occupant would like the vehicle to perform the occupant sensing and calming initiatives as described herein. If the occupant does not opt-in or turn on the sensing and assessment systems, then the process stops at 602. If the occupant opts in, then a plurality of present categories can be provided to the occupant at 603. The occupant can select from any of the multiple sensors to be active and any of the machine-to-human interfaces to provide feedback to the occupant. The machine-to-human interfaces can include video displays, audio signals, and neurological stimulation.

At 604, the vehicle monitors and senses characteristics of the occupant. The vehicle can also monitor other factors that may indicate a stress or anger inducing situation. The biometrics and physical characteristics of the occupant can be measured as described herein. The sensors in the vehicle can sense the occupant's speech, action, and physiological functions as described herein (e.g., facial expression, gestures, heart rate, temperature, etc.) by using camera or other biometric sensing capabilities (e.g., seat sensors) or by recording and analyzing the tone and phrases uttered by the occupant. The occupant's facial expression and changes thereto can also be analyzed to determine the state of the occupant.

At 605, the sensed factors and biometric data relating to the occupant are compared to known standards or past calm behavior. At 606, it is determined if the compared data is outside of a threshold value. The steps 605 and 606 can be performed in the neural network as described herein. The comparison 605 and difference determination 606 can also be performed in a signal processor or in a controller by comparing stored data to the sensed data. At 607, if the threshold is not exceeded, then the process 600 continues to monitor the occupant. Monitoring 604 can be continuous with the comparison and determination steps.

At 608, the environment of the vehicle is monitored for potential stimulus that may affect the emotional state of the occupant. The environmental factors can include the traffic, traffic flow, accident(s), low fuel status, check engine indicator, location, new location, location at which the occupant has experienced stress, and the like. The other factors can include the time of day, the pace of traffic for a given location, the day of week, the past states of the occupant for any of the other factors. The environmental sensors can include an outward-facing camera that observes the outside-vehicle conditions and the stimulus which triggered driver's reaction.

The steps 605, 606, 608 can operate to recognize the occupant's reaction as being anger-based or stress-based, relying on the amalgamation of data from the sensors and the outside-vehicle based data.

At 609, if there are occurrences that indicate that the driver is not acting in a clam manner, then the machine-to-human interface is triggered.

At 610, the human-machine interface can provide an indicator output to the occupant aimed at calming the occupant. The indicator output can be an audio message, a visual, or stimulation as described herein. The audio message can be stored in the vehicle infotainment system and played when the present systems and methods determine that the occupant is stressed or not in a clam state. The visual can be a picture of a loved one (e.g. family, significant other, pet) on a vehicle display. The audio can be playing a favorite song, telling a joke, or playing a witty remark (pre-recorded or collected from public domain).

At 611, the occupant is monitored for a change in emotional state. The monitoring can be the same as that in step 604. At 612, it is determined if the occupant has changed to a calm state. If yes, then the process stops at 613. Stopping indicates that the output ends, however, the monitoring at step 604 can continue as long as the occupant is in the vehicle. If the occupant has not clamed, then the process returns to the output 610 and can repeat the prior output or try a new output.

Figure 7A:
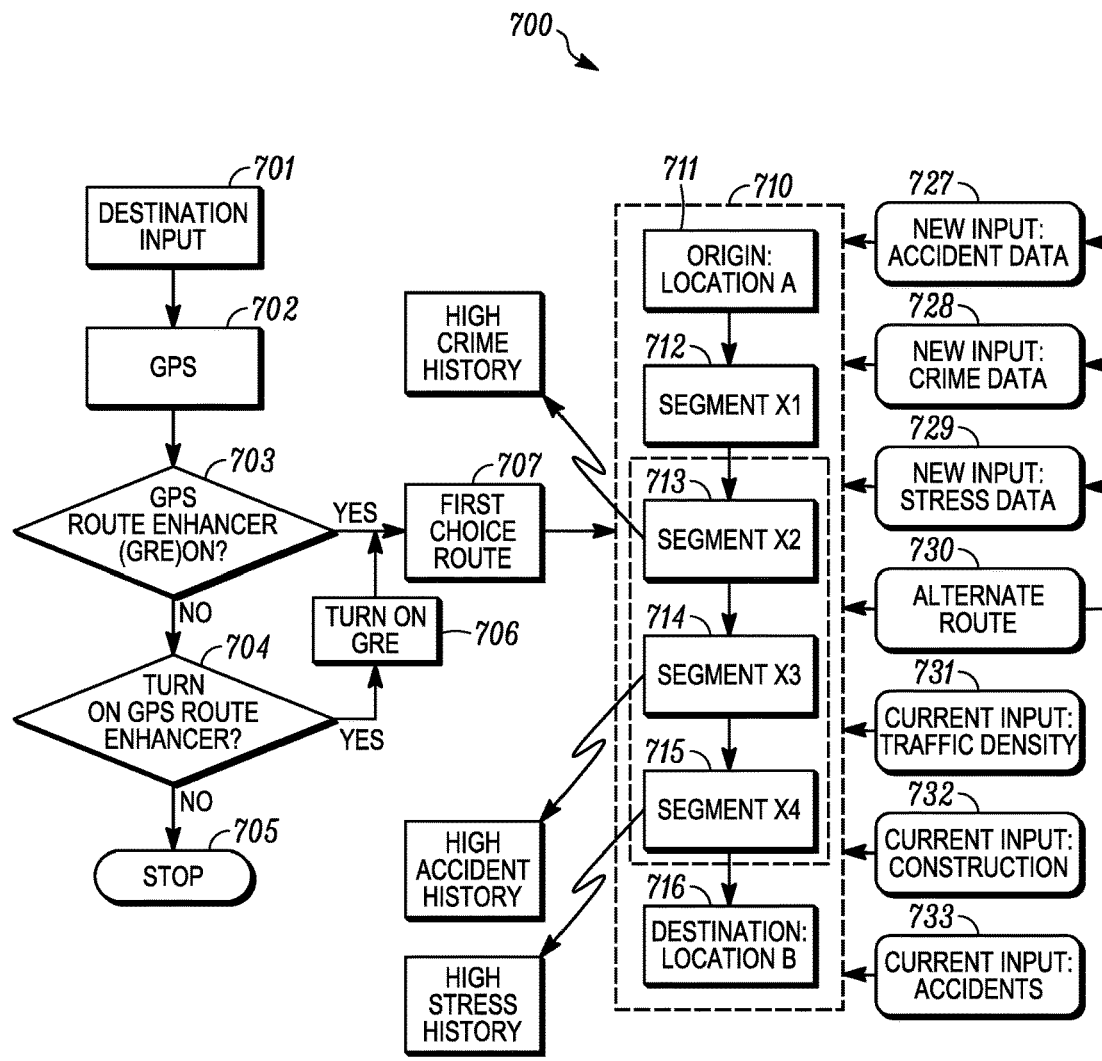
FIG. 7 is a schematic view of a vehicle system according to an example embodiment.
Figure 7B:
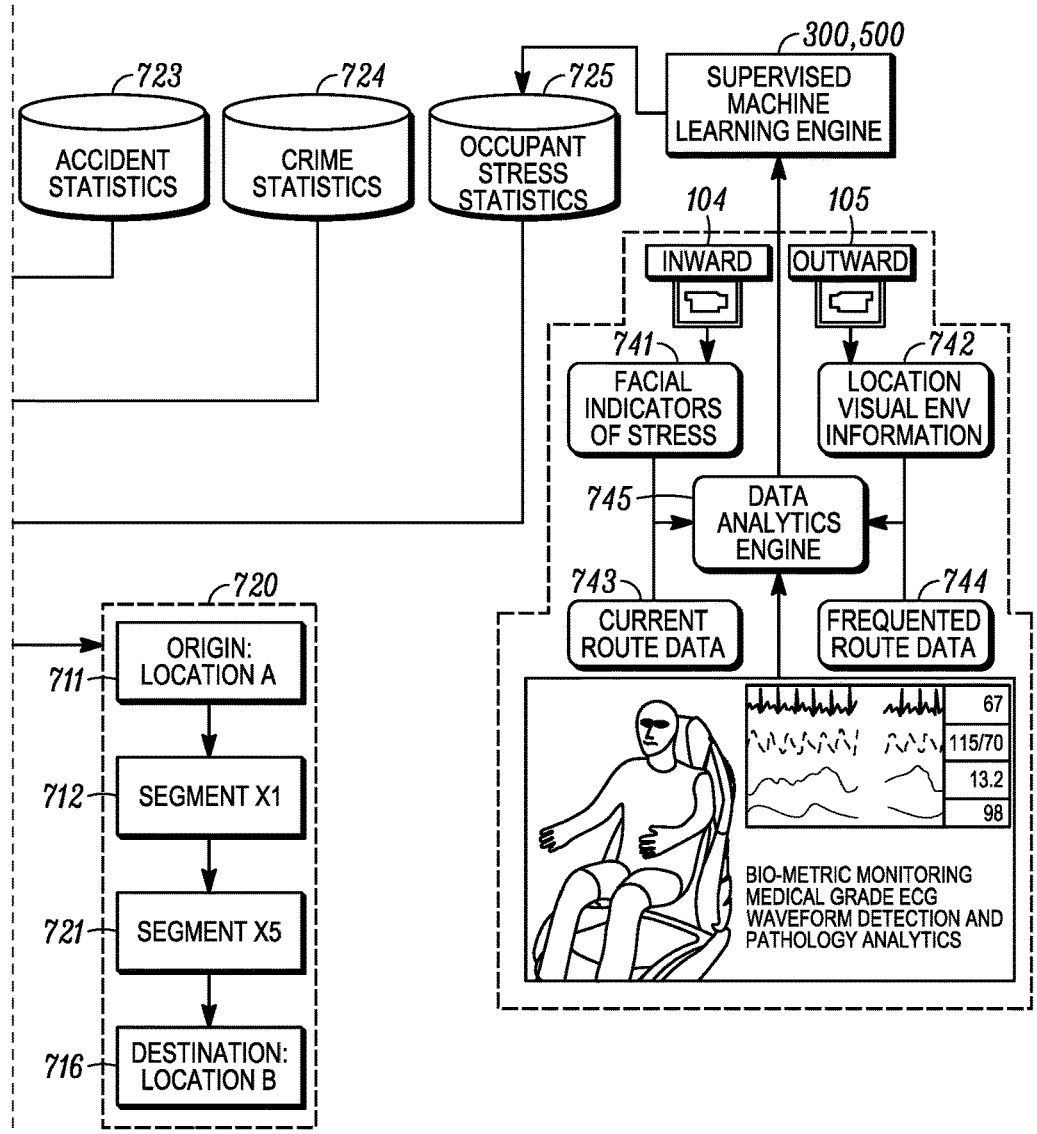

FIG. 7 shows a sensor fusion process 700 to aid the neural network 310 in determining emotional classification of the occupant of the vehicle. The process uses the location information of the vehicle with the emotional classification of the occupant to provide an improved emotional classification. In an aspect, use of both the location information and emotional classification of the driver can be used to plan travel routes to reduce the likelihood of an adverse emotional classification. An adverse emotional classification can be a drowsy state or an anger state. The historical emotional classifications can be stored in memory. The location of any adverse emotional classification can be stored and these locations can be avoided to reduce the likelihood of the adverse emotional classification. In an aspect, the certain real-time events that are likely to trigger an adverse emotional state are occurring and known to the vehicle. The process in the vehicle can use the locations of such events that coincide or trigger adverse emotional classifications and avoid the adverse event locations.

At 701, the destination is input into the vehicle navigation system. At 702, the location system, e.g., Global Positioning System (GPS) in the United States, is powered on and determines the location of the vehicle. At 703, it is determined if the vehicle driver turns on the route enhancer. If not, then at 704 the vehicle requests that the driver turn ON the route enhancer. If the route enhancer is not turned ON, then the process stops at 705. If the route enhancer is turned ON at 706, then a first route is determined at 707. The first route is calculated by the navigational system of the vehicle. The first route, like all routes, can be broken down into segments at 710, e.g., for display in the vehicle.

The route includes an origin 711, multiple segments 712-715, and a destination 716. While shown as four segments in the illustrated example, the present disclosure is not limited to four segments. The first route segment 712 is shown as having no negative indications of possible stress elevation factors. A stress elevation factor is vehicle or driving related circumstance, fact, or influence that contributes to an increase in likelihood that the vehicle occupant will have an adverse emotional state, e.g., as determined using the neural network as described herein. The second route segment 713 does show an indication of stress elevation factors; here, shown as being in a location with a high crime history. The third route segment 714 does show an indication of stress elevation factors; here, shown as being in a location with a high accident history. The fourth route segment 715 also shows an indication of stress elevation factors; here, shown as being in a location with a high stress history.

The driver or the vehicle based on settings can choose an alternate route at 719. The alternate route 720 can include the same origin 711, first segment 712 and destination 716 but the segments 713-715 in the first route 710 that may trigger an adverse stress reaction in the vehicle occupant (e.g., the driver or a passenger) are replaced by an alternate segment 721. The alternate segment 721 will avoid the locations (e.g., roads) in segments 713-715.

The vehicle will include data storage or have remote access to data storage whereat the historical data related to driving environments and stress statistics is stored. An accident statistic datastore 723 stores the data related to accidents involving vehicles, which includes location data. A crime data store 724 stores crime statistics, which includes location data. An emotional state data store 725 stores historical emotional state classifications, which includes location data. While shown as three distinct data stores 723-725 for ease of illustration, it is within the scope of the present disclosure to store the crime data, accident data and emotion stress classification data in a single or multiple data stores.

The vehicle navigational system is fed the accident data from the accident data store 723. The navigational system can determine a route, e.g., the route 710 and then request the accident data for each segment 712-715 from the accident data store 723 based on the segment location data as determined by the navigational system. The navigation system can determine if any negative accident indicator should be part of any individual segment based on the accident data.

The vehicle navigational system is fed the crime data from the crime data store 724. The navigational system can determine a route, e.g., the route 710 and then request the crime data for each segment 712-715 from the crime data store 724 based on the segment location data as determined by the navigational system. The navigation system can determine if any negative crime indicator should be part of any individual segment based on the accident data.

In an aspect, the accident data store 723, the crime data store 724 and the occupant stress data store 725 can each include a negative rating or positive rating based on accident statistics, crime statistics and historical stress determinations (e.g., using the neural network as described herein) for each location. The calculations for the accident rating and the crime rating can be moved off vehicle to a remote server hosting the data stores 723, 724. The occupant stress data store 725 can be on-vehicle as the neural network for classifying vehicle occupant stress is on-vehicle. In an aspect, the occupant stress data store 725 can also be at a remote server. The ratings from the data stores 723, 724, or 725 can be sent to the navigation system for indicating the likelihood of any segment to increase the stress level of a vehicle occupant through an electromagnet communication system. At 727, the accident data pertaining to a route is input from the accident data store 723 into the navigation system. At 728, the crime data pertaining to a route is input from the crime data store 724 into the navigation system. At 729, the occupant stress data pertaining to a route is input from the occupant data store 725 into the navigation system.

In aspects of the present disclosure, other data in addition to crime, accident and occupant stress can be used to determine if a route segment is likely to cause elevated occupant stress. This can be current data, including traffic density data 731, construction data 732, and current accident data 733. These can be provided to the navigational system through a communication channel from a remote server to the vehicle. When the current data is likely to cause an increase in stress in the occupant, then the route segments at which the current events are occurring can be avoided.

The present description is directed to providing a route that do not have segments that trigger stress or elevate stress. However, in some cases avoiding the stress inducing segments may not be possible or desirable, e.g., due to time constraints if such segments and roadways are avoided. The display of the stress inducing segments 713-715 can assist in preparing the occupant for the occurrence of stress inducing situations on the roadway. That is, the occupant can prepare for the stress inducing situations. The vehicle can also prepare for stress inducing locations by providing stress reducing vehicle-to-occupant interactions before the segment or when the occupants stress level increases, e.g., as determined by the neural network at any time in the segment.

The neural networks 300, 500 described herein can be used to classify the emotional state of the occupant. The location of the stress classifications can be provided by the navigation system, e.g., from the GPS device, to be stored in the occupant stress store 725. The neural network 300, 500 can be fed additional data from the vehicle systems. The internal camera 104 and the external camera 105 capture image data that can be used to classification occupant stress. The image data from the inward camera 104 can be analyzed to determine indicators of stress, e.g., facial features, posture and the like. The image data from the exterior camera can be analyzed to determine indicators of stress, e.g., external features, traffic, animals, road conditions, weather and the like. A data analytics engine 745 can receive the processed image data from both cameras, current route information from the navigational system, and historical route information. The data analytics engine 745 processes the received data and provides data to the neural network 300, 500.

The process 700 fuses multiple types of data, e.g., crime, accident and emotional state data, to display possible stress including segments of a travel route uses indicators to highlight the problematic segments to the occupant. The indicators can be visual, e.g., a change in color, different line types, or flashing, to show the occupant the problem travel segments. The indicators can include audio indications, e.g., tones, buzzes, recorded phrases and the like.

The present vehicle system uses sensor fusion-aided location routing that considers occupant stress classification levels while driving through certain portions of the route, crime and accident statistics of the regions along the route and offers the driver a choice to pick an alternate route. As the travel progresses, the biometric sensors in the seat, an inward facing camera, or other cabin sensors with the neural network described herein sense elevated stress levels to determine that the occupant is uncomfortable driving through a certain portion of the route. The system can also use the outward facing camera data in combination with the data from the inward facing camera and biometric sensors in the seat to correlate the reason for elevated stress. In an aspect, the route is updated with coded indicators showing that an individual segment is likely to increase stress. Based on historic occupant stress level data on frequented routes, the vehicle can present alternate routes to avoid stress-causing areas (e.g., mistimed traffic lights or prolonged red-light intersections in addition to those described above). The vehicle system and process can be part of a safety feature in their GPS system that can potentially reduce anxiety in the vehicle occupant caused by sudden entrance into a route segment that is unexpected and may cause an increase in stress.

FIG. 8 shows a schematic audio system 800 that can use the controllers and the neural network as described herein to output audio into the vehicle cabin. The audio output can be used to reduce stress in the occupant. 801 senses the position of the vehicle occupant. The sensor 801 can include the seat sensors as described herein. The occupant's position can include whether any individual seat is occupied, e.g., the driver seat, the front passenger seat, the rear driver-side passenger seat, and the rear passenger-side seat. In an aspect, the seat sensors 801 can also determine posture of the seat occupant.

The occupant's emotional classification 803 is also determined as described herein, e.g., using the neural network.

An audio controller 805 receives the occupant position data and the occupant's emotional classification. The audio controller 805 can control the individual audio experience 807 for the occupant based on the emotional classification and the occupant position. The individual audio experience settings that are stress relieving can be stored in the vehicle infotainment system. When the emotional classification, e.g., from the neural network, triggers an audio action in an attempt to return the occupant to a calm state or alert state, the audio controller can trigger and appropriate audio event from the individual audio experience to be output from the speakers 809.

A microphone 811 can detect the sound in the vehicle cabin and provide a sensed sound signal to the controller 805. The controller 805 can use the sensed sound to control the audio experience of any individual occupant. The controller 805 can send the sensed sound to the neural network for use in classifying the emotional state of the occupant.

The individual audio experience 807 can be adjusting the audio output from the speakers to center the audio on the seat(s) at which an occupant is seated. With only the driver in the vehicle, the audio can be centered on the driver seat. In an aspect, the present system 800 senses the occupant posture at 801 and can further refine the position of the audio to be center based on seat occupancy and the occupant's posture, e.g., leaning toward the door or leaning toward the center of the vehicle. In an aspect, the individual audio experience may do the opposite. The neural network determines that the occupant is drowsy, then the audio output can be changed from being centered on the drowsy occupant to various locations in the vehicle in an attempt to return the occupant to an alter state from the drowsy state. The audio controller can produce an audio experience that rotates the center of the audio output from seat to seat, e.g., in a clockwise direction, or from the driver seat to the rear, passenger-side seat.

The speakers 809 can include a speaker mounted in the head restraint in the seat. This seat mounted speaker can deliver individual audio, essentially to just the seat occupant. The individual seat audio can be triggered by the classified emotional state. The seat audio can be any of the audio described herein to reduce an aroused state or elevated emotional valence to an acceptable classification.

The audio controller 805 can also sense, e.g., through microphone 811, when occupants in the vehicle are having a conversation and can control the audio output, e.g., volume, center location and equalization based on the conversation and the emotional classification of the occupants in the conversation.

The vehicle's audio system 800 can use an algorithm in the controller 805 to create a real-time, adaptive, musical/sonic atmosphere in the vehicle cabin. The timbre, rhythm, harmonic content, mood, and feel of the audio output will be generated in real-time and informed by data taken from the plurality of sensors in the vehicle. The audio system continues to provide adjustable audio parameters, e.g., ambiance, sharpness, rhythm, tone, etc., and augments this with real-time decisions based on sensed occupant position and emotional classification of the occupant.

The system exists primarily within the automotive seat but can exist in conjunction with the seat and surrounding automotive space or stand-alone in the headliner, steering wheel/instrument panel, and/or b-pillar for front rows as well as on the rear dash of car passenger vehicles.

Emotion recognition from physiological signals attracted the attention of researchers from different disciplines, such as affective computing, cognitive science and psychology. This present systems and methods can classify emotional state using peripheral physiological signals sensed in a vehicle based on arousal-valence evaluation using a neural network in a vehicle. Examples of sensed signals include electrocardiogram signals, respiration volume signals, skin temperature signals and galvanic skin response signals; however, the present disclosure is not limited to only these signals.

The present system can be used in an autonomous vehicle, e.g., a levels 1-2 automobile(s), where the vehicle uses the level of distraction, a determination of distractedness, or the multiple sensor determination of a distracted driver, to be able to judge the most appropriate time to switch from manual to autonomous drive and vice-versa, or to engage certain levels of countermeasures.

This system is beneficial to all modes of transportation extending even beyond automotive and personal vehicle to other motorized, driven or piloted conveyances.

The present disclosure illustrates a controller 102. It is within the scope of the present disclosure for the controller 102 to represent multiple processors, memories and electronic control units, which can work independently with various systems to affect the functions and tasks described herein. The vehicle may use a more distributed controller system then a single controller and remain within the scope of the present disclosure. The controller 102 includes circuitry to process sensed signals that represent real world conditions and data.

The present disclosure describes systems and method for calculation of emotional state and arousal of the vehicle occupant based on sensed biological data. Other sensed data can be used in the calculation and can be used to confirm the calculated result. Other sensed data can include data from the internal camera and the operation of the vehicle, e.g., drifting or crossing lines in the street, excessive acceleration and braking.

One example of electro-dermal potential may be a type of electroencephalography (EEG), which is an electrophysiological monitoring method to record electrical activity of the brain. It is typically noninvasive, with the electrodes placed along the scalp, although invasive electrodes are sometimes used in specific applications. EEG measures voltage fluctuations resulting from ionic current within the neurons of the brain. In clinical contexts, EEG refers to the recording of the brain's spontaneous electrical activity over a period of time, as recorded from multiple electrodes placed on the scalp. Diagnostic applications generally focus on the spectral content of EEG, that is, the type of neural oscillations that can be observed in EEG signals.

The classification of the occupant of the vehicle can be used to identify levels of emotional state of emotional state of the occupant. The emotional state of a vehicle driver correlate to various driving states. Examples of driving states can include a serious health condition, which may cause distraction in a vehicle. Emotional state of a driver may account for a significant number of automobile accidents or other driving incidents. By classifying a vehicle occupant's state, the vehicle can deploy a number of countermeasures, thus moving the occupant from an undesirable state to a desirable state, which can improve the driving experience. The countermeasures can include vehicle systems, e.g., video, audio, climate control, braking, collision avoidance, warning systems, machine-to-human measures, e.g., visuals, music, verbal warnings, to notify the occupant about their state or modify their state. Additionally, monitoring and classifying the emotional state helps to promote a better quality of life and increased life expectancy.

The present disclosure includes computational logic in a processor for detailed emotional arousal/valence classification through multisensory, multilayer, neural network utilization to generate an artificial intelligence system capable of increasingly accurate continuous monitoring by the sensors in the vehicle. This system is capable of utilizing machine learning, and planning from that learning, to raise occupant-centric emotional intelligence and provide an increasingly precise emotional and occupant identification output useable by secondary systems. The system uses biometric raw inputs from, e.g., the central nervous system, and may include sympathetic nervous system, parasympathetic nervous system, biochemical responses, and combinations thereof. The multilayer neural network in the processor initially processes inputs and metrics individually and then passes or represses information outputs from the singular measures in a weighted fashion of confidence to assess the emotional condition of the occupant. As the system database grows it utilizes the stored information in multiple fashions. Some, but not limited to, examples of the learning and planning aspects of the system are to stabilize the emotional classification against packets of corrupted or low confidence data such that the change in emotional states temporally aligns with the body's ability to change states in time. Another example is the systems long-term predictive analytics that connect time, day, season, weather, and the like to the likelihood of the particular occupant's emotional state in those conditions in order to suggest preemptive countermeasures. Additionally, a long-term trend analysis and short-term variability can be used to offer occupants an indicator of changes (stabilization or degeneration) of their emotional health.

The neural network as described herein uses multiple sensed signals and sensor data fusion to classify the occupant's state and may decrease the occurrence of false results. The improved classification can benefit the occupant by providing improved classification that is customized, triggers countermeasures, and long term emotional health tracking. The present disclosure can attempt to reduce negative emotional statuses, which can be dangerous when operating a vehicle. The correct emotional classification can improve user experience and data to vehicle manufacturers to improve their products.

While the present disclosure describes neural networks as computing or data processing systems, other types of computing devices may be adopted to process the sensed signals to fuse multiple sensed signals to classify the vehicle occupant. The data processing system can be a Bayesian network, an inductive logic programmed system, or a rule-based learning system. These systems can be contained in a programmable logic array or other suitable computer system While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system, comprising:
 a first occupant sensor to sense central nervous system characteristics of an occupant, wherein the first occupant sensor senses neuroelectric signals;
 a second occupant sensor to sense non-central nervous system characteristics of the occupant, wherein the second occupant sensor includes a contactless sensor configured to sense at last one of a sympathetic nervous signal, an autonomic nervous signal, a parasympathetic nervous system signal, or combinations thereof, and wherein the second occupant sensor senses near-infrared spectroscopy signals;
 a neural network configured to receive the sensed central nervous system characteristics and the sensed non-central nervous system characteristics and to determine that the occupant has one of a plurality of emotional states based on the sensed central nervous system characteristics and the sensed non-central nervous system characteristics, wherein the plurality of emotional states comprises calm, stressed, and agitated, wherein the neural network includes a first path to process neuroelectric signals, wherein the neural network includes a second path to process near-infrared spectroscopy signals, wherein the first path performs both frequency analysis and temporal analysis of the neuroelectric signals, wherein the first path includes a plurality of first nodes at a cortical and regional signal analysis layer, and wherein the second path includes a plurality of second nodes at a regional activation or deactivation layer; and
 a navigation system configured to plan a travel route for a vehicle based on crime data for a road segment of the travel route in response to an occupant having a determined emotional state of stressed or agitated, wherein the navigation system is configured to receive crime data, accident data and occupant stress data for each segment of the planned travel route and when a segment includes a level of any of crime, accident or stress data above an associated threshold, then recalculating the planned travel route to include a different segment with a level of any of crime, accident or stress data below the associated threshold.

2. The vehicle system of claim 1, wherein the first occupant sensor senses neuroelectric signals, wherein the neural network includes a first path to process neuroelectric signals, wherein the second occupant sensor senses near-infrared spectroscopy signals, and wherein the neural network includes a second path to process near-infrared spectroscopy signals.

3. The vehicle system of claim 2, wherein the first path performs both frequency analysis and temporal analysis of the neuroelectric signals.

4. The vehicle system of claim 3, wherein the first path includes a plurality of first nodes at a cortical and regional signal analysis layer; and wherein the second path includes a plurality of second nodes at a regional activation or deactivation layer.

5. The vehicle system of claim 1, further comprising a seat configured to support the person as an occupant and to be mounted in a vehicle; and wherein the first occupant sensor includes a contactless electro-dermal potential sensor mounted in the seat adjacent a head of the occupant.

6. The vehicle system of claim 5, wherein the second occupant sensor is a seat-mounted contactless sensor.

7. The vehicle system of claim 1, wherein the neural network is further configured to (i) determine for a stressed emotional state of the occupant, whether a level of stress of the occupant exceeds a stress threshold, (ii) determine for an agitated emotional state of the occupant, whether a level of agitation of the occupant exceeds an agitation threshold, and (iii) output an indicator signal when the stress threshold or the agitation threshold is exceeded, and wherein the vehicle system further comprises a vehicle-to-occupant interface configured to receive the indicator signal from the neural network and to output an indicator notice within a vehicle cabin to the occupant.

8. The vehicle system of claim 7, wherein the vehicle-to-occupant interface outputs a neural stimulation signal from an emitter in a seat to reduce the determined emotional state of the occupant to below the threshold.

9. The vehicle system of claim 7, wherein the indicator notice includes a stored audio signal to calm the occupant below the threshold.

10. The vehicle system of claim 7, wherein the indicator notice includes a visual image on a display in the vehicle cabin to calm the occupant below the threshold.

11. The vehicle system of claim 7, wherein the neural network compares the sensed non-central nervous system characteristics of the occupant from the second occupant sensor to stored non-central nervous system characteristics of the occupant to determine if the occupant is in a non-calm state and if the non-calm state is determined, then triggering an occupant intervention action in the vehicle cabin.

12. The vehicle system of claim 1, wherein the second occupant sensor includes an interior camera mounted in a vehicle cabin directed at a seat to sense the occupant to determine facial expressions.

13. A vehicle system, comprising:
a first occupant sensor to sense central nervous system characteristics of an occupant, wherein the first occupant sensor senses neuroelectric signals;
a second occupant sensor to sense non-central nervous system characteristics of the occupant, wherein the second occupant sensor includes a contactless sensor configured to sense at last one of a sympathetic nervous signal, an autonomic nervous signal, a parasympathetic nervous system signal, or combinations thereof, and wherein the second occupant sensor senses near-infrared spectroscopy signals;
a neural network configured to receive the sensed central nervous system characteristics and the sensed non-central nervous system characteristics, to determine that the occupant has one of a plurality of emotional states based on the sensed central nervous system characteristics and the sensed non-central nervous system characteristics, wherein the plurality of emotional states comprises calm, stressed, and agitated, to output a stress level or an agitation level based on the sensed central nervous system characteristics and the sensed non-central nervous system characteristics, and to store the stress level or agitation level in association with a road segment, wherein the neural network includes a first path to process neuroelectric signals, wherein the neural network includes a second path to process near-infrared spectroscopy signals, wherein the first path performs both frequency analysis and temporal analysis of the neuroelectric signals, wherein the first path includes a plurality of first nodes at a cortical and regional signal analysis layer, and wherein the second path includes a plurality of second nodes at a regional activation or deactivation layer; and
a navigation system configured to plan a travel route for a vehicle based on (i) a stored stress level or a stored agitation level of the occupant for a road segment of the travel route, and (ii) crime data for the road segment of the travel route, wherein the navigation system is configured to receive crime data, accident data and occupant stress data for each segment of the planned travel route and when a segment includes a level of any of crime, accident or stress data above an associated threshold, then recalculating the planned travel route to include a different segment with a level of any of crime, accident or stress data below the associated threshold.

14. The vehicle system of claim 13, wherein navigation system is configured to receive real-time driving conditions for each segment of the recalculated travel route and indicate when current driving conditions are likely to trigger stress as determined by the neural network.

15. The vehicle system of claim 13, further comprising a seat configured to support a person as an occupant and to be mounted in a vehicle; and wherein the first occupant sensor includes a contactless electro-dermal potential sensor mounted in the seat adjacent a head of the occupant.

16. The vehicle system of claim 15, wherein the second occupant sensor is a seat-mounted contactless sensor; and wherein the neural network compares the sensed non-central nervous system characteristics of the occupant from the second occupant sensor to stored non-central nervous system characteristics of the occupant to determine that the occupant is in a stressed or agitated state and to trigger an occupant intervention action in a vehicle cabin.

* * * * *